US010142339B2

United States Patent
Liu et al.

(10) Patent No.: US 10,142,339 B2
(45) Date of Patent: Nov. 27, 2018

(54) IDENTITY AUTHENTICATION SYSTEM, APPARATUS, AND METHOD, AND IDENTITY AUTHENTICATION REQUEST APPARATUS

(71) Applicant: KUANG-CHI INTELLIGENT PHOTONIC TECHNOLOGY LTD., Shenzhen (CN)

(72) Inventors: Ruopeng Liu, Shenzhen (CN); Silu Xu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 263 days.

(21) Appl. No.: 15/047,653

(22) Filed: Feb. 19, 2016

(65) Prior Publication Data
US 2016/0173498 A1 Jun. 16, 2016

Related U.S. Application Data

(63) Continuation of application No. PCT/CN2014/082760, filed on Jul. 22, 2014.

(30) Foreign Application Priority Data

Aug. 19, 2013 (CN) .......................... 2013 1 0363035

(51) Int. Cl.
*H04L 9/32* (2006.01)
*H04L 29/06* (2006.01)
(Continued)

(52) U.S. Cl.
CPC .......... *H04L 63/0884* (2013.01); *G06F 21/35* (2013.01); *H04L 9/0656* (2013.01);
(Continued)

(58) Field of Classification Search
CPC ......... G06F 21/35; H04L 9/0656; H04L 9/32; H04L 9/3297; H04L 63/0428;
(Continued)

(56) References Cited

U.S. PATENT DOCUMENTS

2003/0210783 A1* 11/2003 Filippi .................. H04L 9/0656
380/44
2006/0177065 A1* 8/2006 Halbert ................ H04L 9/0662
380/277
(Continued)

FOREIGN PATENT DOCUMENTS

CN 101102324 A 1/2008
CN 102300182 A 12/2011
(Continued)

OTHER PUBLICATIONS

Supplementary European Search Report dated Mar. 1, 2017 for EP14838636.0.
(Continued)

*Primary Examiner* — Khang Do
(74) *Attorney, Agent, or Firm* — Perkins Coie LLP

(57) ABSTRACT

The present invention provides an identity authentication system, apparatus and method and an identity authentication request apparatus. The system includes: an identity authentication request apparatus, configured to send a verification code issuing request to an identity authentication apparatus; the identity authentication apparatus, configured to respond to the verification code issuing request sent by the identity authentication request apparatus, generate an ID and a corresponding verification code according to the verification code issuing request, bind the generated ID and the verification code, store the generated ID, the verification code, and a binding record, and feed back feedback information that carries the verification code to the identity authentica- (Continued)

tion request apparatus. The present invention provides a practical and effective identity authentication mechanism.

11 Claims, 10 Drawing Sheets

(51) Int. Cl.
    *H04L 9/06*     (2006.01)
    *G06F 21/35*     (2013.01)
    *H04W 12/04*     (2009.01)
    *H04W 12/06*     (2009.01)

(52) U.S. Cl.
    CPC ........ *H04L 9/3215* (2013.01); *H04L 63/0428* (2013.01); *H04L 63/123* (2013.01); *H04W 12/04* (2013.01); *H04W 12/06* (2013.01); *H04L 2209/80* (2013.01); *H04L 2463/121* (2013.01)

(58) Field of Classification Search
    CPC ............... H04L 63/0884; H04L 63/123; H04L 2463/121; H04W 16/02; H04W 16/04; H04W 16/06
    See application file for complete search history.

(56) References Cited

U.S. PATENT DOCUMENTS

| | | | |
|---|---|---|---|
| 2008/0046366 A1* | 2/2008 | Bemmel | G06Q 20/20 705/44 |
| 2009/0160649 A1 | 6/2009 | O'Brien et al. | |
| 2010/0153249 A1* | 6/2010 | Yuan | G06Q 20/02 705/34 |
| 2011/0078198 A1* | 3/2011 | Lee | H04L 67/1095 707/783 |
| 2012/0330769 A1* | 12/2012 | Arceo | G06Q 20/32 705/21 |
| 2013/0061289 A1 | 3/2013 | McFarland et al. | |
| 2013/0159186 A1 | 6/2013 | Brudnicki et al. | |
| 2013/0212248 A1 | 8/2013 | Neafsey et al. | |
| 2013/0297422 A1* | 11/2013 | Hunter | G06Q 30/0261 705/14.58 |
| 2014/0133451 A1* | 5/2014 | Li | H04W 8/186 370/329 |
| 2014/0281587 A1* | 9/2014 | Ignatchenko | G06F 21/64 713/193 |
| 2016/0150411 A1* | 5/2016 | Liu | G06F 21/31 726/4 |

FOREIGN PATENT DOCUMENTS

| | | |
|---|---|---|
| CN | 102752276 A | 10/2012 |
| JP | 2005-309148 A | 11/2005 |
| JP | 2007-156785 A | 6/2007 |
| JP | 2010-044654 A | 2/2010 |
| KR | 1020100104156 A | 9/2010 |

OTHER PUBLICATIONS

D. W. Davies, W. L. Price; Security for Computer Networks; Dec. 5, 1989; Nikkei Inc.; Version 1-1; p. 126-129.

* cited by examiner

IDENTITY AUTHENTICATION SYSTEM, APPARATUS, AND METHOD, AND IDENTITY AUTHENTICATION REQUEST APPARATUS

CROSS REFERENCE TO RELATED APPLICATIONS

This application is a continuation of PCT/CN2014/082760 filed on Jul. 22, 2014, which claims priority to Chinese patent application No. 201310363035.7 filed Aug. 19, 2013, both of which are incorporated herein by reference.

FIELD OF THE INVENTION

The disclosure relates to the photoelectric field, and in particular, to an identity authentication system, apparatus and method and an identity authentication request apparatus.

BACKGROUND

A light controlled system applied to an access control system may be called a photonic access control system. A traditional access management system uses a smart card as a unique personal identifier to get registered on a distribution platform (network) beforehand (related data of the registration is stored onto a controller by using a device network). When accessing a door, a user slightly swings a held smart card within a valid range of a card reader to perform feature recognition. After being read by the card reader, data of the smart card is transmitted to the controller, and the controller determines the identity according to matching between stored registration information and acquired data. If the matching succeeds, processing is performed normally, namely, an electronic lock is driven to open the door; otherwise, the door keeps closed, and event information may be transmitted to a system such as an alarm system and a monitoring system so that a third party processes the event information.

Likewise, in a photonic access control system, identity recognition information of a photonic client (such as a photonic mobile phone or called a photonic key client) needs to be allocated. For the photonic access control system, an ID may be used to recognize the photonic mobile phone uniquely, which, however, requires an ID allocation platform (network) for allocating IDs uniformly. Currently, no practical and effective ID allocation mechanism or identity authentication mechanism is available in a photonic access control system.

SUMMARY OF THE INVENTION

Embodiments of the present invention provide an identity authentication system, method and apparatus to implement a practical and effective identity authentication mechanism.

According to one aspect of the embodiments of the present invention, an identity authentication system is provided, including an identity authentication request apparatus and an identity authentication apparatus. The identity authentication request apparatus is configured to send a verification code issuing request to the identity authentication apparatus; the identity authentication apparatus is configured to respond to the verification code issuing request sent by the identity authentication request apparatus, generate an ID and a corresponding verification code according to the verification code issuing request, bind the generated ID and the verification code, store the generated ID, the verification code, and a binding record, and feed back feedback information that carries the verification code to the identity authentication request apparatus; the identity authentication request apparatus is further configured to receive the feedback information from the identity authentication apparatus, and send an ID issuing request to the identity authentication apparatus, where the ID issuing request includes the verification code carried in the feedback information; and the identity authentication apparatus is further configured to parse the received ID issuing request and determine whether the verification code included in the ID issuing request matches the stored verification code, and if the verification code included in the received ID issuing request matches the stored verification code, send allocation information that carries the ID to the identity authentication request apparatus.

The identity authentication request apparatus is further configured to encrypt and store the ID, a unique identifier of the identity authentication request apparatus, and a counter value after receiving the allocation information that carries the ID.

The identity authentication apparatus is further configured to perform source encryption and/or channel encryption for the feedback information that carries the verification code before the feedback information that carries the verification code is fed back to the identity authentication request apparatus; and the identity authentication apparatus is further configured to perform source encryption and/or channel encryption for the allocation information that carries the ID before the allocation information that carries the ID is sent to the identity authentication request apparatus.

The identity authentication apparatus is further configured to encrypt the generated ID, and the verification code and the binding record by using a sync encryption algorithm that is based on a scrambling code and a pseudo-code; and the identity authentication request apparatus is further configured to encrypt the ID, the unique identifier of the identity authentication request apparatus, and the counter value by using the sync encryption algorithm that is based on a scrambling code and a pseudo-code.

The scrambling code is a scrambling code that is randomly selected from a randomly generated hexadecimal scrambling code group, and a quantity of bits of the scrambling code is consistent with a quantity of bits of information that needs to be encrypted; the encrypting the generated ID, and the verification code and the binding record by using a sync encryption algorithm that is based on a scrambling code, or the encrypting the ID, the unique identifier of the identity authentication request apparatus, and the counter value by using the sync encryption algorithm that is based on a scrambling code, includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

The pseudo-code is a group of randomly generated digits, letters, symbols, or a combination of at least one thereof; the encrypting the generated ID, and the verification code and the binding record by using a sync encryption algorithm that is based on a pseudo-code, or the encrypting the ID, the unique identifier of the identity authentication request apparatus, and the counter value by using the sync encryption algorithm that is based on a pseudo-code, includes: adding the pseudo-code into a trailer of the information that is encrypted by using the scrambling code, so that the quantity of bits of the information increases to a preset quantity of bits.

The source encryption is performed by using one of the following encryption algorithms: an AES (Advanced Encryption Standard, advanced encryption standard) algorithm, a 3DES (Triple DES, Triple Data Encryption Algorithm, triple data encryption algorithm) algorithm, and an RC4 algorithm.

Algorithms used for the channel encryption include a time-based sync encryption algorithm.

The performing channel encryption by using a time-based sync encryption algorithm includes: acquiring current time information; adding the time information into the feedback information or the allocation information; generating or selecting a group of scrambling codes according to the time information; and performing scrambling for the feedback information or the allocation information by using the generated or selected group of scrambling codes.

The identity authentication request apparatus is further configured to decrypt encrypted information received from the identity authentication apparatus, so as to extract the time information; if a time in the time information is greater than a time stored in the identity authentication request apparatus, determine that the verification code fed back or the allocated ID is legal; otherwise, if the time in the time information is less than or equal to the time stored in the identity authentication request apparatus, determine that the verification code fed back or the allocated ID is illegal.

The identity authentication system may be disposed in an access control system, a ticketing system, or a consumption management system.

According to another aspect of the embodiments of the present invention, an identity authentication apparatus is further provided, including: a generating module, configured to receive a verification code issuing request sent by the identity authentication request apparatus, generate an ID and a corresponding verification code according to the verification code issuing request, and bind the generated ID and the verification code; a storing module, configured to store the generated ID, the verification code, and a binding record; a feedback module, configured to feed back feedback information that carries the verification code to the identity authentication request apparatus; a receiving module, configured to receive an ID issuing request from the identity authentication request apparatus, where the ID issuing request includes the verification code carried in the feedback information; and a determining module, configured to parse the verification code included in the received ID issuing request and determine whether the verification code included in the received ID issuing request matches the verification code stored in the storing module, where the feedback module is further configured to: when a determining result of the determining module is matching, send allocation information that carries the ID to the identity authentication request apparatus.

The identity authentication apparatus further includes an encrypting module, configured to perform source encryption and/or channel encryption for the feedback information that carries the verification code before the feedback module feeds back the feedback information that carries the verification code to the identity authentication requestication code, where the encrypting module is further configured to perform source encryption and/or channel encryption for the allocation information that carries the ID before the feedback module sends the allocation information that carries the ID to the identity authentication request apparatus.

The encrypting module is further configured to encrypt the generated ID, and the verification code and the binding record by using a sync encryption algorithm that is based on a scrambling code and a pseudo-code.

The scrambling code is a scrambling code that is randomly selected from a randomly generated hexadecimal scrambling code group, and a quantity of bits of the scrambling code is consistent with a quantity of bits of information that needs to be encrypted; the encrypting, by the encrypting module, the generated ID, the corresponding verification code, and the binding record by using a sync encryption algorithm that is based on a scrambling code includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

The pseudo-code is a group of randomly generated digits, letters, symbols, or a combination of at least one thereof; the encrypting, by the encrypting module, the generated ID, the corresponding verification code, and the binding record by using a sync encryption algorithm that is based on a pseudo-code includes: adding the pseudo-code into a trailer of the information that is encrypted by using the scrambling code, so that the quantity of bits of the information increases to a preset quantity of bits.

Algorithms used for the channel encryption include a time-based sync encryption algorithm, and the source encryption is performed by using one of the following encryption algorithms: an AES algorithm, a 3DES algorithm, and an RC4 algorithm.

The performing, by the encrypting module, channel encryption by using a time-based sync encryption algorithm includes: acquiring current time information; adding the time information into the feedback information or the allocation information; generating or selecting a group of scrambling codes according to the time information; and performing scrambling for the feedback information or the allocation information by using the generated or selected group of scrambling codes.

According to another aspect of the embodiments of the present invention, an identity authentication request apparatus is further provided, which communicates with an identity authentication apparatus and includes: a requesting module, configured to send a verification code issuing request to the identity authentication apparatus; a receiving module, configured to receive feedback information that carries a verification code from the identity authentication apparatus, where the verification code is generated by the identity authentication apparatus according to the verification code issuing request in response to the verification code issuing request, where the identity authentication apparatus further generates an ID corresponding to the verification code, binds the generated ID and the verification code, and stores the generated ID, the verification code and a binding record; a sending module, configured to send an ID issuing request to the identity authentication request apparatus, where the ID issuing request includes the verification code carried in the feedback information; and the receiving module is further configured to receive allocation information that carries the ID from the identity authentication apparatus, where the allocation information is sent by the authentication apparatus to the identity authentication request apparatus when the identity authentication apparatus parses the received ID issuing request and determines that the verification code included in the ID issuing request matches the stored verification code.

The identity authentication request apparatus further includes an encrypting module, configured to encrypt and store the ID, a unique identifier of the identity authentication request apparatus, and a counter value after receiving the allocation information that carries the ID.

The encrypting module is further configured to encrypt the ID, the unique identifier of the identity authentication request apparatus, and the counter value by using the sync encryption algorithm that is based on a scrambling code and a pseudo-code.

The scrambling code is a scrambling code that is randomly selected from a randomly generated hexadecimal scrambling code group, and a quantity of bits of the scrambling code is consistent with a quantity of bits of information that needs to be encrypted; the encrypting, by the encrypting module, the ID, the unique identifier of the identity authentication request apparatus, and the counter value by using the sync encryption algorithm that is based on a scrambling code includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

The identity authentication request apparatus further includes: a determining module, configured to decrypt encrypted information received from the identity authentication apparatus, so as to extract time information; if a time in the time information is greater than a time stored in the identity authentication request apparatus, determine that the verification code fed back or the allocated ID is legal; otherwise, if the time in the time information is less than or equal to the time stored in the identity authentication request apparatus, determine that the verification code fed back or the allocated ID is illegal.

According to still another aspect of the embodiments of the present invention, an identity authentication method is further provided, which is applied to an identity authentication request apparatus and an identity authentication apparatus and includes: the identity authentication request apparatus sends a verification code issuing request to the identity authentication apparatus; the identity authentication apparatus responds to the verification code issuing request sent by the identity authentication request apparatus, generates an ID and a corresponding verification code according to the verification code issuing request, binds the generated ID and the verification code, stores the generated ID and the verification code and a binding record, and feeds back feedback information that carries the verification code to the identity authentication request apparatus; the identity authentication request apparatus receives, from the identity authentication apparatus, the feedback information that is fed back, and sends an ID issuing request to the identity authentication apparatus, where the ID issuing request includes the verification code carried in the feedback information; and the identity authentication apparatus parses the received ID issuing request and determines whether the verification code included in the ID issuing request matches the stored verification code, and if the verification code included in the received ID issuing request matches the stored verification code, sends allocation information that carries the ID to the identity authentication request apparatus.

The identity authentication method further includes: encrypting and storing, by the identity authentication request apparatus, the ID, a unique identifier of the identity authentication request apparatus, and a counter value after receiving the allocation information that carries the ID.

Before the step of feeding back the feedback information that carries the verification code to the identity authentication request apparatus, the identity authentication method further includes: performing source encryption and/or channel encryption for the feedback information that carries the verification code.

Before the step of sending the allocation information that carries the ID to the identity authentication request apparatus, the identity authentication method further includes: performing source encryption and/or channel encryption for the allocation information that carries the ID.

The identity authentication apparatus encrypts the generated ID, and the verification code and the binding record by using a sync encryption algorithm that is based on a scrambling code and a pseudo-code; and the identity authentication request apparatus encrypts the ID, the unique identifier of the identity authentication request apparatus, and the counter value by using the sync encryption algorithm that is based on a scrambling code and a pseudo-code.

The scrambling code is a scrambling code that is randomly selected from a randomly generated hexadecimal scrambling code group, and a quantity of bits of the scrambling code is consistent with a quantity of bits of information that needs to be encrypted; the encrypting the generated ID, and the verification code and the binding record by using a sync encryption algorithm that is based on a scrambling code, or the encrypting the ID, the unique identifier of the identity authentication request apparatus, and the counter value by using the sync encryption algorithm that is based on a scrambling code, includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

The pseudo-code is a group of randomly generated digits, letters, symbols, or a combination of at least one thereof; the encrypting the generated ID, and the verification code and the binding record by using a sync encryption algorithm that is based on a pseudo-code, or the encrypting the ID, the unique identifier of the identity authentication request apparatus, and the counter value by using the sync encryption algorithm that is based on a pseudo-code, includes: adding the pseudo-code into a trailer of the information that is encrypted by using the scrambling code, so that the quantity of bits of the information increases to a preset quantity of bits.

Algorithms used for the channel encryption include a time-based sync encryption algorithm, and the source encryption is performed by using one of the following encryption algorithms: an AES algorithm, a 3DES algorithm, and an RC4 algorithm.

The performing channel encryption by using a time-based sync encryption algorithm includes: acquiring current time information; adding the time information into the feedback information or the allocation information; generating or selecting a group of scrambling codes according to the time information; and performing scrambling for the feedback information or the allocation information by using the generated or selected scrambling codes.

The identity authentication method further includes: decrypting, by the identity authentication request apparatus, encrypted information received from the identity authentication apparatus, so as to extract the time information; if a time in the time information is greater than a time stored in the identity authentication request apparatus, determining that the verification code fed back or the allocated ID is legal; otherwise, if the time in the time information is less than or equal to the time stored in the identity authentication request apparatus, determining that the verification code fed back or the allocated ID is illegal.

The technical solution of the present invention provides a practical and effective identity authentication mechanism, which is universally applicable to an existing photonic access control system or the like to implement a function of ID distribution or identity authentication.

BRIEF DESCRIPTION OF DRAWINGS

The accompanying drawings described herein are intended for better understanding of the present invention, and constitute a part of this application. Exemplary embodiments and descriptions thereof in the present invention are intended to interpret the present invention and do not constitute any improper limitation on the present invention. In the accompanying drawings.

EMBODIMENTS

The following describes the present invention in detail with reference to accompanying drawings and embodiments. It should be noted that the embodiments in this application and features in the embodiments may be combined with each other without conflicts.

Figure 1:
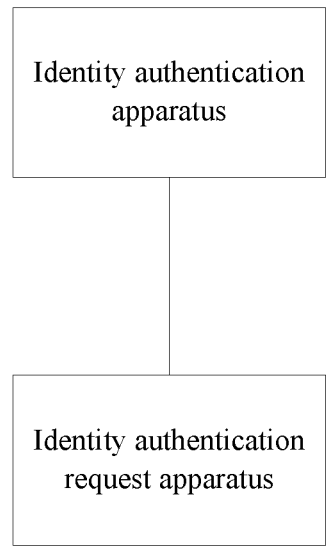
FIG. 1 is a schematic structural diagram of an identity authentication system according to an embodiment of the present invention.

FIG. 1 is a schematic structural diagram of an identity authentication system according to an embodiment of the present invention. As shown in FIG. 1, the identity authentication system includes an identity authentication apparatus and an identity authentication request apparatus.

The identity authentication request apparatus is configured to send a verification code issuing request to the identity authentication apparatus.

The identity authentication apparatus, configured to respond to the verification code issuing request sent by the identity authentication request apparatus, generate an ID and a corresponding verification code according to the verification code issuing request, bind the generated ID and the verification code, store the generated ID, the verification code, and a binding record, and feed back feedback information that carries the verification code to the identity authentication request apparatus.

The identity authentication request apparatus is further configured to receive the feedback information from the identity authentication apparatus, and send an ID issuing request to the identity authentication apparatus, where the ID issuing request includes the verification code carried in the feedback information.

The identity authentication apparatus is further configured to parse the received ID issuing request and determine whether the verification code included in the ID issuing request matches the stored verification code, and if the verification code included in the received ID issuing request matches the stored verification code, send allocation information that carries the ID to the identity authentication request apparatus.

The identity authentication system provided in this embodiment is universally applicable to an existing photonic access control system or the like to effectively implement a function of ID distribution or identity authentication.

Preferably, the identity authentication request apparatus may be further configured to encrypt and store the ID, a unique identifier of the identity authentication request apparatus, and a counter value after receiving the allocation information that carries the ID.

In this preferred embodiment, the identity authentication request apparatus may further encrypt the finally obtained ID, the unique identifier of the photonic client, and the counter value, which improves information security in the system.

Preferably, the identity authentication apparatus may be further configured to perform source encryption and/or channel encryption for the feedback information that carries the verification code before the feedback information that carries the verification code is fed back to the identity authentication request apparatus.

Preferably, the identity authentication apparatus may be further configured to perform source encryption and/or channel encryption for the allocation information that carries the ID before the allocation information that carries the ID is sent to the identity authentication request apparatus.

Preferably, the identity authentication apparatus is further configured to encrypt the generated ID, and the verification code and the binding record by using a sync encryption algorithm that is based on a scrambling code and a pseudo-code.

Preferably, the identity authentication request apparatus is further configured to encrypt the ID, the unique identifier of the identity authentication request apparatus, and the counter value by using the sync encryption algorithm that is based on a scrambling code and a pseudo-code.

The encryption function provided in the foregoing preferred embodiments can improve information security of the entire system significantly, and one or more of encryption measures mentioned above may be applied depending on conditions.

In an identity authentication system provided in a preferred embodiment, data security may be ensured by using a sync encryption manner based on a scrambling code and a pseudo code. Scrambling is an algorithm used to perform dynamic encryption for data, that is, a string generated each time is different. Pseudo-code-adding further interferes with generated scrambled information, and imposes comprehensive interference on the scrambled information by means of preceding, appending, or both preceding and appending.

Multiple scrambling-based encryption manners are available for selection. This preferred embodiment provides a preferred manner, and in the preferred scrambling encryption manner, a scrambling code is randomly selected from a randomly generated hexadecimal scrambling code group, where a quantity of bits of the scrambling code is consistent with a quantity of bits of information that needs to be encrypted; the encrypting by using the scrambling code includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

In the preferred embodiment, because the scrambling code used for scrambling each time is randomly selected from the scrambling code group, which ensures that the generated ciphertext is dynamically changing. The quantity of bits of the scrambling code is consistent with the quantity of bits of the encrypted information, which makes it easy to implement a scrambling process. For example, to encrypt 32-bit ID data, the quantity of bits of the scrambling code corresponding to the ID data needs to be 32. The quantity of scrambling codes in the group may be set according to complexity of application. For example, in a system that requires high performance but does not require high security, we can set that the group of scrambling codes contains 16 hexadecimal scrambling codes; in a system that does not require high performance but requires a high security coefficient, it may be set that the group of scrambling codes contains 256 or more hexadecimal scrambling codes. The information that needs to be encrypted is converted into hexadecimal information because the data that is ultimately operated in a computer is binary strings. Hexadecimal information can be converted into binary information very easily, and is more readable than binary information. Therefore, preferably, the information that needs to be encrypted may be converted into hexadecimal information first, and then a scrambling code is selected randomly, and is operated bit by bit with the information that needs to be encrypted, so as to scramble a corresponding signal. In the scrambling and encryption process, the scrambling code is a key of the scrambling and descrambling algorithm.

Multiple encryption manners based on a scrambling code are available for selection too. This preferred embodiment provides a preferred manner. In the preferred pseudo-code encryption manner, the pseudo-code is a group of randomly generated digits, letters, symbols, or a combination of at least one thereof; the encrypting by using the pseudo-code includes: adding the pseudo-code into a trailer of the information that is encrypted by using the scrambling code and needs to be encrypted, so that the quantity of bits of the information increases to a preset quantity of bits.

Figure 2:
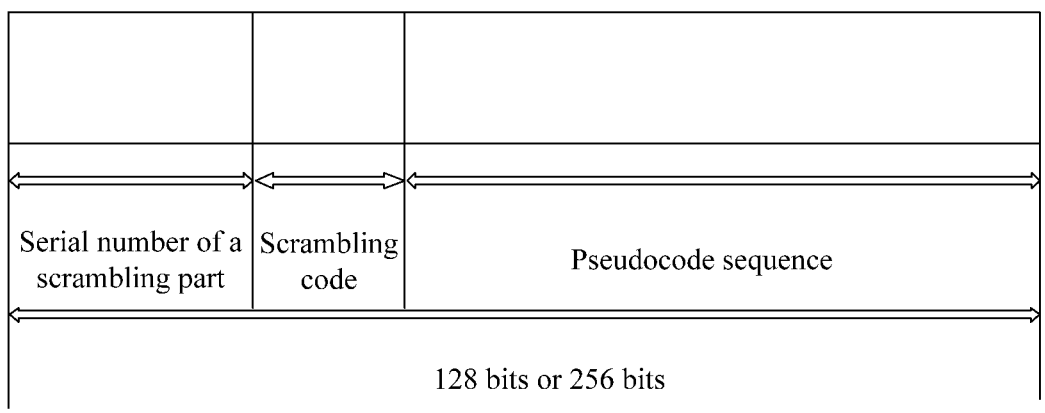
FIG. 2 is a schematic structural diagram of scrambled and pseudo-code-added information according to a preferred embodiment of the present invention.

After verification information, an ID and their correspondence are scrambled and the scrambled information is stored into a database, a user sees a ciphertext when the user logs into the database and views the verification information and the ID. However, professionals do not feel enough difficulty of cracking the information. In order to further increase complexity of the algorithm, a pseudo-code may be appended to the scrambled ciphertext so that the quantity of bits of the ciphertext increases to the specified quantity of bits such as 128 bits or 256 bits (see FIG. 2). In this way, a cracker of the ciphertext will mistakenly regard the encryption as an encryption algorithm such as an AES, and fail in cracking.

Certainly, if a plaintext needs to be recovered from the encrypted plaintext (including scrambled and pseudo-code-added) and displayed onto an interface, the ciphertext needs to be pseudo-decoded and descrambled. Pseudo-code-removing is a process of removing the pseudo-code of the ciphertext. For example, a 128-bit ciphertext is generated, in which there are 10 valid bits of the ciphertext, and the remaining 118 bits are the corresponding pseudo-code. The pseudo-code-removing is implemented by intercepting the preceding 10 bits of valid information and discarding the 118 bits of the pseudo-code. Descrambling is an inverse operation of scrambling the pseudo-decoded ciphertext. For example, if the original scrambling operation is an XOR operation, the descrambling algorithm is also an XOR operation; if the original scrambling operation is to perform an addition operation on the plaintext and the scrambling code and then seek a one's complement thereof, the descrambling algorithm is to seek a one's complement thereof, and then perform a subtraction operation with the scrambling code.

The following describes the present invention by using a specific preferred embodiment. In the preferred embodiment, a main function of the identity authentication apparatus is implemented by using host computer software installed on the identity authentication apparatus. Certainly, the functions of the identity authentication apparatus may also be implemented by using hardware circuits. Under current technical conditions, using software based on a universal hardware identity authentication apparatus is relatively convenient and practical, and the identity authentication apparatus is a mobile phone light key. After generating verification information and an ID by means of a network, the host computer host encrypts the information and stores the information into database records, where the encryption is based on a scrambling and pseudo-code-adding algorithm, so as to ensure security of the database records. When the information needs to be extracted for displaying on the interface, the ciphertext needs to be descrambled and pseudo-decoded. After the mobile phone light key inputs verification information and obtains an ID by means of the network, in order to ensure security of the ID, the counter value, and the mobile phone serial number, the three types of information also need to be scrambled and pseudo-code-added and stored. Before sending a light signal, the mobile phone light key needs to perform descrambling and pseudo-code-removing operations on the three types of information. Specifically, the identity authentication system provided in the preferred embodiment primarily implements the following functions:

Function 1: After generating the verification information by means of the network, the host computer software encrypts the verification code, the ID and the binding record and stores them into the database. In addition, a login account and a login password of the database are another encryption protection. The double security measure ensures that the data stored in the database is very secure.

The encryption algorithm used in the encryption is a sync encryption algorithm based on a scrambling code and a pseudo-code, which is specifically as follows: A group of randomly generated scrambling codes are set first, where the quantity of bits of a scrambling code is consistent with the quantity of bits of the encrypted information. For example, when 32-bit ID data is encrypted, the quantity of bits of the scrambling code corresponding to the ID data is 32, and the quantity of the scrambling codes in the group may be set according to complexity of application. For example, in a system that requires high performance but does not require high security, we can set that the group of scrambling codes contains 16 hexadecimal scrambling codes; in a system that does not require high performance but requires a high security coefficient, it may be set that the group of scrambling codes contains 256 or more hexadecimal scrambling codes.

The scrambling code is a key of the scrambling and descrambling algorithm.

The information that needs to be encrypted is converted into hexadecimal information because the data that is ultimately operated in a computer is binary strings. Hexadecimal information can be converted into binary information very easily, and is more readable than binary information. Therefore, the information that needs to be encrypted may be converted into hexadecimal information first, and then a scrambling code is selected randomly from the scrambling code group, and is operated bit by bit with the information that needs to be encrypted, so as to scramble the information. The operation may be performed in different ways, such as XOR operation, negation operation, seeking a two's complement, and seeking a one's complement.

After the information is scrambled, source information becomes an irregular ciphertext. The scrambling code used for scrambling each time is randomly selected from the scrambling code group, which ensures that the generated ciphertext is dynamically changing.

Here the verification information and the ID that are generated by the host computer by means of the network are scrambled, and the scrambled information is stored into a database. Therefore, a user sees a ciphertext if the user logs into the database and views the verification information and the ID. However, professionals do not feel enough difficulty of cracking the information. In order to further increase complexity of the algorithm, a pseudo-code may be appended to the scrambled ciphertext so that the quantity of bits of the ciphertext increases to the specified quantity of bits such as 128 bits or 256 bits. In this way, a cracker of the ciphertext will mistakenly regard the encryption as an encryption algorithm such as an AES, and fail in cracking.

The pseudo-code contains a series of randomly generated variable digits or a combination of digits and uppercase and lowercase letters.

If a plaintext needs to be recovered from the encrypted plaintext (including scrambled and pseudo-code-added) and displayed onto an interface, the ciphertext needs to be pseudo-decoded and descrambled. Pseudo-code-removing is a process of removing the pseudo-code of the ciphertext. For example, a 128-bit ciphertext is generated, in which there are 10 valid bits of the ciphertext, and the remaining 118 bits are the corresponding pseudo-code. The pseudo-code-removing is implemented by intercepting the preceding 10 bits of valid information and discarding the 118 bits of the pseudo-code. Descrambling is an inverse operation of scrambling the pseudo-decoded ciphertext. For example, if the original scrambling operation is an XOR operation, the descrambling algorithm is also an XOR operation; if the original scrambling operation is to perform an addition operation on the plaintext and the scrambling code and then seek a one's complement thereof, the descrambling algorithm is to seek a one's complement thereof, and then perform a subtraction operation with the scrambling code.

Function 2: After the mobile phone light key acquires the ID by inputting a verification code, where the acquired ID information, the unique identifier of the mobile phone, and the counter value all need security protection, and before the information is stored, an encryption operation may be performed on the information by using the foregoing method. When the information is retrieved for use, a decryption operation may be performed on the ciphertext by means of descrambling and pseudo-code-adding by using the foregoing method. The principles are the same as those of function 1, The following gives three preferred embodiments to describe the foregoing functions implemented in a process in which an identity authentication system performs scrambling/descrambling and pseudo-code-adding/pseudo-code-removing of information.

Preferred Embodiment 1

Figure 3:
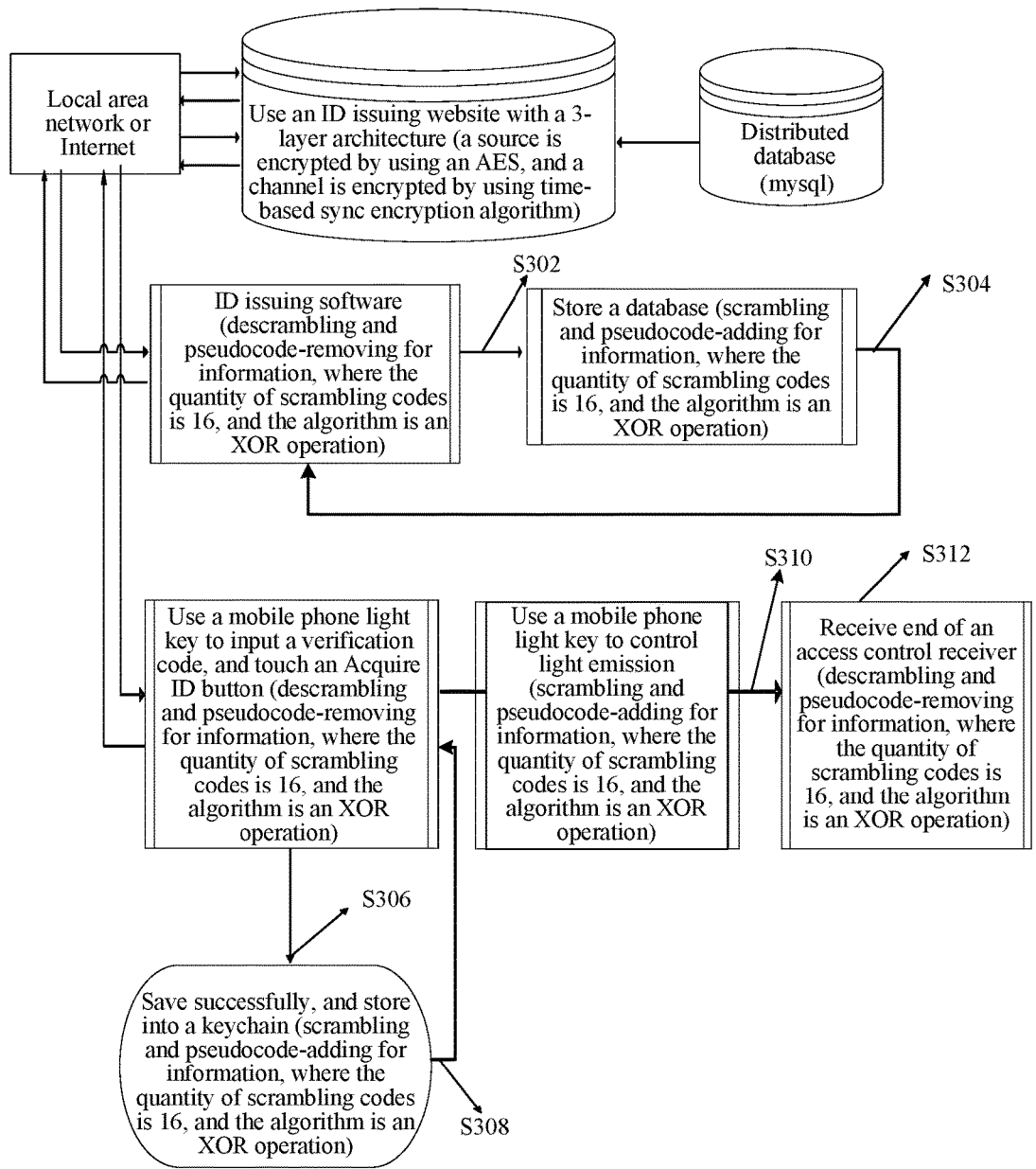
FIG. 3 is a flowchart of scrambling/descrambling and pseudo-code-adding/pseudo-code-removing of information by an identity authentication system according to a preferred Embodiment 1 of the present invention.

FIG. 3 is a flowchart of scrambling/descrambling and pseudo-code-adding/pseudo-code-removing of information by an identity authentication system according to a preferred Embodiment 1 of the present invention. As shown in FIG. 3, the process includes:

S302. After acquiring an ID and a verification code by means of a network, ID issuing software performs scrambling and pseudo-code-adding operations on the two types of information to obtain two ciphertexts, and stores the ciphertexts into related records of an ID allocation table of a database, thereby ensuring security of content of the data table. A scrambling code group used herein contains 16 scrambling codes, an XOR operation is used as a scrambling algorithm, and a length of the pseudo-code and the scrambling code is 128 bits.

S304. In order to facilitate viewing of ID distribution status, a table is designed to display allocated ID serial numbers and a verification code list, and therefore, a pseudo-code-removing operation and a descrambling operation need to be performed on the ciphertext in the database to recover the original information so that the ID allocation status is displayed correctly in the table. The scrambling code group used herein contains 16 scrambling codes, the descrambling algorithm is an XOR operation, and the length of the pseudo-code and the scrambling code is 128 bits.

S306. After acquiring the ID by means of the network, a mobile phone light key needs to encrypt three types of information: the ID, a counter value, and a mobile phone serial number, where the algorithm used herein is scrambling and pseudo-code-adding, a scrambling code group used herein contains 16 scrambling codes, an XOR operation is used as a scrambling algorithm, and the length of the pseudo-code and the scrambling code is 128 bits. After being encrypted, the information is stored into a secure place such as a keychain.

S308. Before controlling light emission, the mobile phone light key needs to retrieve the ciphertext stored in the secure place, and then perform pseudo-code-removing and descrambling operations on the ciphertext to recover the original information. The scrambling code group used herein contains 16 scrambling codes, the descrambling algorithm is an XOR operation, and the length of the pseudo-code and the scrambling code is 128 bits.

S310. To ensure security between the mobile phone light key and a receive end, scrambling and pseudo-code-adding operations are performed on the information sent by the mobile phone light key. A scrambling code group used herein contains 16 scrambling codes, an XOR operation is used as a scrambling algorithm, and the length of the pseudo-code and the scrambling code is 128 bits.

S312. After receiving the ciphertext information, the receive end performs pseudo-code-removing and descrambling operations on the ciphertext information to recover the original information, and then performs a next operation. The scrambling code group used herein contains 16 scrambling codes, the descrambling algorithm is an XOR operation, and the length of the pseudo-code and the scrambling code is 128 bits.

In the preferred embodiment, an average-level security scrambling algorithm is applied, the scrambling codes are distributed in 16 manners, and the length of information after the pseudo-code is added is 128 bits, thereby preventing information leakage and ensuring security of stored information.

Preferred Embodiment 2

Figure 4:
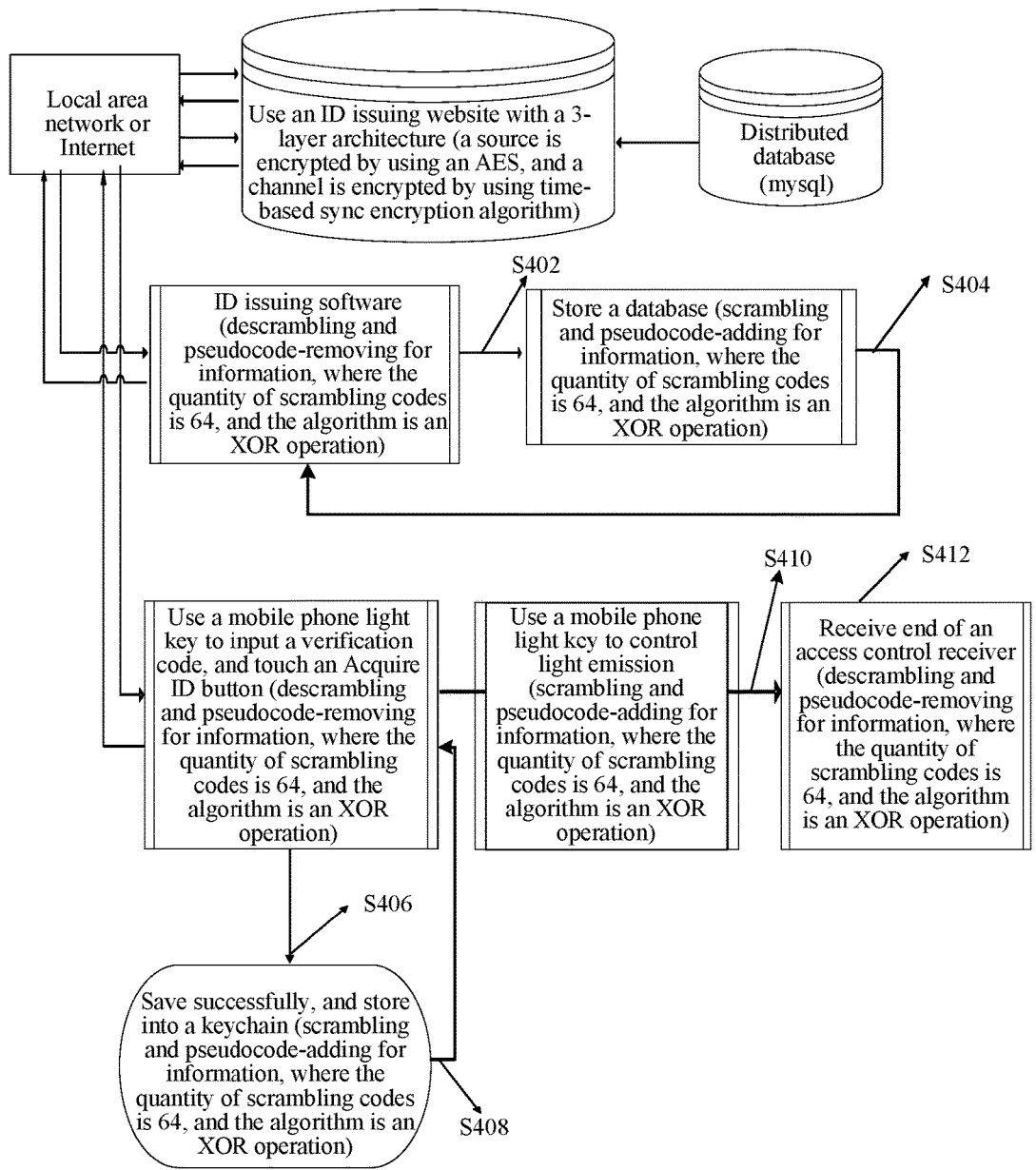
FIG. 4 is a flowchart of scrambling/descrambling and pseudo-code-adding/pseudo-code-removing of information by an identity authentication system according to a preferred Embodiment 2 of the present invention.

FIG. 4 is a flowchart of scrambling/descrambling and pseudo-code-adding/pseudo-code-removing of information by an identity authentication system according to a preferred Embodiment 2 of the present invention. As shown in FIG. 4, the process includes:

S402. After acquiring an ID and a verification code by means of a network, ID issuing software performs scrambling and pseudo-code-adding operations on the two types of information to obtain two ciphertexts, and stores the ciphertexts into related records of an ID allocation table of a database, thereby ensuring security of content of the data table. A scrambling code group used herein contains 64 scrambling codes, an XOR operation is used as a scrambling algorithm, and the length of the pseudo-code and the scrambling code is 128 bits.

S404. In order to facilitate viewing of ID distribution status, a table is designed to display allocated ID serial numbers and a verification code list, and therefore, a pseudo-code-removing operation and a descrambling operation need to be performed on the ciphertext in the database to recover the original information and thus display the ID allocation status correctly in the table. The scrambling code group used herein contains 64 scrambling codes, the descrambling algorithm is an XOR operation, and the length of the pseudo-code and the scrambling code is 128 bits.

S406. After acquiring the ID by means of the network, a mobile phone light key needs to encrypt three types of information: the ID, a counter value, and a mobile phone serial number, where the algorithm used herein is scrambling and pseudo-code-adding, a scrambling code group used herein contains 64 scrambling codes, an XOR operation is used as a scrambling algorithm, and the length of the pseudo-code and the scrambling code is 128 bits. After being encrypted, the information is stored into a secure place such as a keychain.

S408. Before controlling light emission, the mobile phone light key needs to retrieve the ciphertext stored in the secure place, and then perform pseudo-code-removing and descrambling operations on the ciphertext to recover the original information. The scrambling code group used herein contains 64 scrambling codes, the descrambling algorithm is an XOR operation, and the length of the pseudo-code and the scrambling code is 128 bits.

S410. To ensure security between the mobile phone light key and a receive end, scrambling and pseudo-code-adding operations are performed on the information sent by the mobile phone light key. A scrambling code group used herein contains 64 scrambling codes, an XOR operation is used as a scrambling algorithm, and the length of the pseudo-code and the scrambling code is 128 bits.

S412. After receiving the ciphertext information, the receive end performs pseudo-code-removing and descrambling operations on the ciphertext information to recover the original information, and then performs a next operation. The scrambling code group used herein contains 64 scrambling codes, the descrambling algorithm is an XOR operation, and the length of the pseudo-code and the scrambling code is 128 bits.

In the preferred embodiment, a medium-level security scrambling algorithm is applied, the scrambling codes are distributed in 64 manners, and the length of information after the pseudo-code is added is 128 bits, thereby preventing information leakage and ensuring security of stored information.

Preferred Embodiment 3

Figure 5:
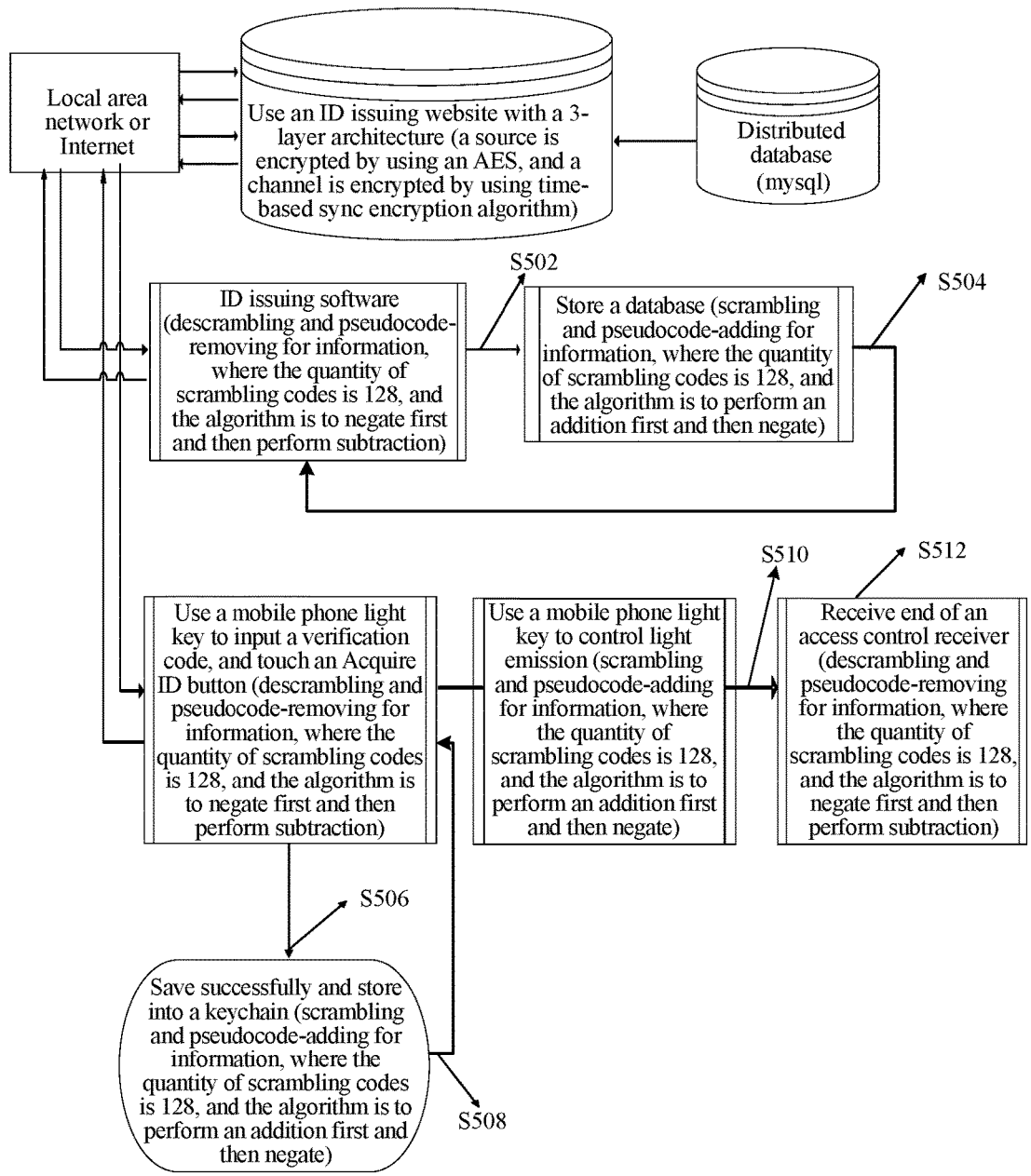
FIG. 5 is a flowchart of scrambling/descrambling and pseudo-code-adding/pseudo-code-removing of information by an identity authentication system according to a preferred Embodiment 3 of the present invention.

FIG. 5 is a flowchart of scrambling/descrambling and pseudo-code-adding/pseudo-code-removing of information by an identity authentication system according to a preferred Embodiment 3 of the present invention. As shown in FIG. 5, the process includes:

S502. After acquiring an ID and a verification code by means of a network, ID issuing software performs scrambling and pseudo-code-adding operations on the two types of information to obtain two ciphertexts, and stores the ciphertexts into related records of an ID allocation table of a database, thereby ensuring security of content of the data table. A scrambling code group used herein contains 128 scrambling codes, an XOR operation is used as a scrambling algorithm, and a length of the pseudo-code and the scrambling code is 256 bits.

S504. In order to facilitate viewing of ID distribution status, a table is designed to display allocated ID serial numbers and a verification code list, and therefore, a pseudo-code-removing operation and a descrambling operation need to be performed on the ciphertext in the database to recover the original information and thus display the ID allocation status correctly in the table. The scrambling code group used herein contains 128 scrambling codes, the descrambling algorithm is an XOR operation, and the length of the pseudo-code and the scrambling code is 256 bits.

S506. After acquiring the ID by means of the network, a mobile phone light key needs to encrypt three types of information: the ID, a counter value, and a mobile phone serial number, where the algorithm used herein is scrambling and pseudo-code-adding, a scrambling code group used herein contains 128 scrambling codes, an XOR operation is used as a scrambling algorithm, and the length of the pseudo-code and the scrambling code is 256 bits. After being encrypted, the information is stored into a secure place such as a keychain.

S508. Before controlling light emission, the mobile phone light key needs to retrieve the ciphertext stored in the secure place, and then perform pseudo-code-removing and descrambling operations on the ciphertext to recover the original information. The scrambling code group used herein contains 128 scrambling codes, the descrambling algorithm is an XOR operation, and the length of the pseudo-code and the scrambling code is 256 bits.

S510. To ensure security between the mobile phone light key and a receive end, scrambling and pseudo-code-adding operations are performed on the information sent by the mobile phone light key. A scrambling code group used herein contains 128 scrambling codes, an XOR operation is used as a scrambling algorithm, and the length of the pseudo-code and the scrambling code is 256 bits.

S512. After receiving the ciphertext information, the receive end performs pseudo-code-removing and descrambling operations on the ciphertext information to recover the original information, and then performs a next operation. The scrambling code group used herein contains 128 scrambling codes, the descrambling algorithm is an XOR operation, and the length of the pseudo-code and the scrambling code is 256 bits.

In the preferred embodiment, a high-security scrambling algorithm is applied, the scrambling codes are distributed in 128 manners, and the length of information after the pseudo-code is added is 256 bits, thereby preventing information leakage and ensuring security of stored information.

The foregoing embodiment and preferred embodiments primarily improve information security of the identity authentication system from a perspective of information storing. In order to further improve the information security of the identity authentication system, improvement may be made from a perspective of information sending. The identity authentication system provided in this preferred embodiment further adds an encryption process in the information sending process, and uses double encryption including source encryption and/or channel encryption to ensure security transmission of the information on the network, thereby further improving information security of the identity authentication system.

Algorithms applicable to source encryption and/or channel encryptions are diversified, and this embodiment gives preferred selections. Preferably, the source encryption may be performed by using one of the following encryption algorithms: an AES algorithm, a 3DES algorithm, an RC4 algorithm; and the channel encryption may be a time-based sync encryption algorithm.

Preferably, the performing channel encryption by using a time-based sync encryption algorithm may include: acquiring current time information; adding the time information into the feedback information or the allocation information; generating or selecting a group of scrambling codes according to the time information; and performing scrambling for the feedback information or the allocation information by using the generated or selected group of scrambling codes.

Preferably, the identity authentication request apparatus may be further configured to decrypt encrypted information received from the identity authentication apparatus, so as to extract the time information; if a time in the time information is greater than a time stored in the identity authentication request apparatus, determine that the verification code fed back or the allocated ID is legal; otherwise, if the time in the time information is less than or equal to the time stored in the identity authentication request apparatus, determine that the verification code fed back or the allocated ID is illegal.

In the identity authentication system provided in the preferred embodiment, a source is encrypted first by using a symmetric or asymmetric encryption algorithm (AES algorithm, 3DES algorithm, RC4 algorithm), and then channel security is implemented by using a time-based sync encryption algorithm. The encryption algorithm generates different scrambling code serial numbers according to dynamic change of time, and then retrieves a corresponding scrambling code, and performs an operation on the scrambling code and a part that needs to be encrypted (for details, see the scrambling encryption process described above). After acquiring information, the receive end (ID issuing end, photonic client) finds a corresponding scrambling code according to the transmitted serial number, and then performs an operation on the information by using the scrambling code so as to obtain source information, and then compares time information in the source information with time information in a database to determine whether the information is generated by copying on the network, thereby preventing spoofing.

Figure 6:
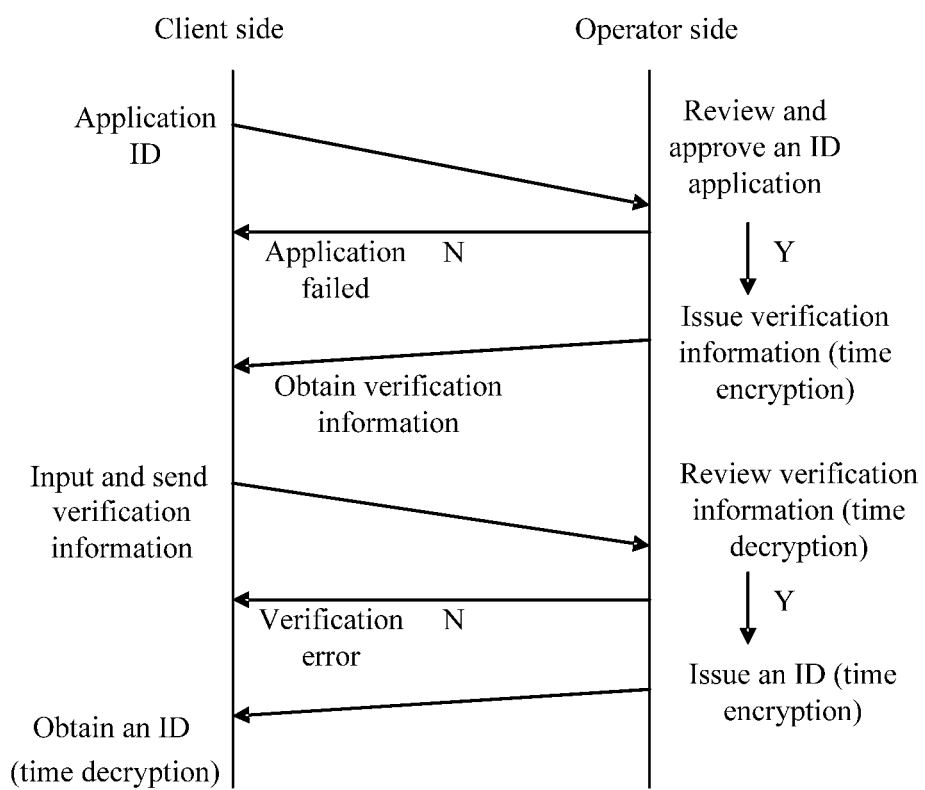
FIG. 6 is a schematic flowchart of acquiring an ID that is encrypted in a time-based encryption manner according to a preferred embodiment of the present invention.

The following describes the present invention by using a specific preferred embodiment. In the preferred embodiment, the main function of the identity authentication apparatus is implemented by host computer software installed on the identity authentication apparatus, and the identity authentication request apparatus is a mobile phone photonic client. When generating verification code for and issuing and ID to the mobile phone photonic client by means of the network, the host computer software performs source and/or channel encryption for the network. The source encryption may be performed by using a symmetric or asymmetric encryption algorithm, and the channel encryption is performed by using a time-based sync encryption algorithm, thereby maximally ensuring security of data transmission on the network, as shown in FIG. 6. Specifically, the identity authentication system provided in the preferred embodiment primarily implements the following functions:

Function 1: While the host computer software generates verification information by means of the network, security in the information transmission process is ensured by using a time-based sync encryption algorithm. On the Internet or a local area network, anyone can intercept information by using a tool. Therefore, the information is not secure. To ensure security in the network transmission process, content in an HTTP request sent by the host computer software needs to be encrypted, which is called source encryption, and the entire transmitting channel needs to be encrypted, namely, channel encryption.

The source encryption may be performed by using various symmetric or asymmetric encryption algorithms.

After the content is encrypted, although the source information ensures security, if someone copies the information in the transmission process without decrypting the information, and then initiates the same operation again, the network is unable to determine whether the person that sends the request is the user or a third-party attacker, and therefore, believes that the operation is legal. If the information sent on the channel changes dynamically, namely, the information sent each time is different, it can be avoided that the third-party attacker copies the network information and sends the information again, and the time changes dynamically. In this way, the entire information may be encrypted by using time. The network time information is acquired from the Internet first, and the time information is added into the source information. The second of time is used as a seed of a random number, so as to ensure that the generated random number changes dynamically. Here the generated random number may be used to point to a serial number of a group of scrambling codes, namely, point to a serial number of a specified subscript value (random number) of an array in which the scrambling code is located, the random number information is added into the source information, and then an XOR operation is performed on the entire information source (excluding the random number) by using the serial number. After receiving the information, a receiver extracts the random number from the information, and then extracts the serial number of the specified subscript value (random number) of the array in which the scrambling code is located, and performs an XOR operation on the entire information (excluding the random number) by using the serial number so as to recover the source information, and then extracts the time information in the source information. If verification information is generated for the first time, the time information in the source information in the operation is recorded in the database; if verification information is generated for the second time, the time information extracted from the source information is compared with the time information that is recorded in the database when the operation of generating the verification information is performed previously, and if the former is greater than the latter, it indicates a true user, or, if the former is less than or equal to the latter, it indicates that a third-party attacker is spoofing by copying the information on the network.

Function 2: While the mobile phone photonic client acquires the ID by means of the network and the network issues the ID, security in the information transmission process is ensured by using a time-based sync encryption algorithm, where the implementation process of ensuring security is the same as that in function 1.

The following gives three preferred embodiments to describe the foregoing functions implemented in a process of acquiring an ID encrypted in a time-based encryption manner.

Preferred Embodiment 4

Figure 7:
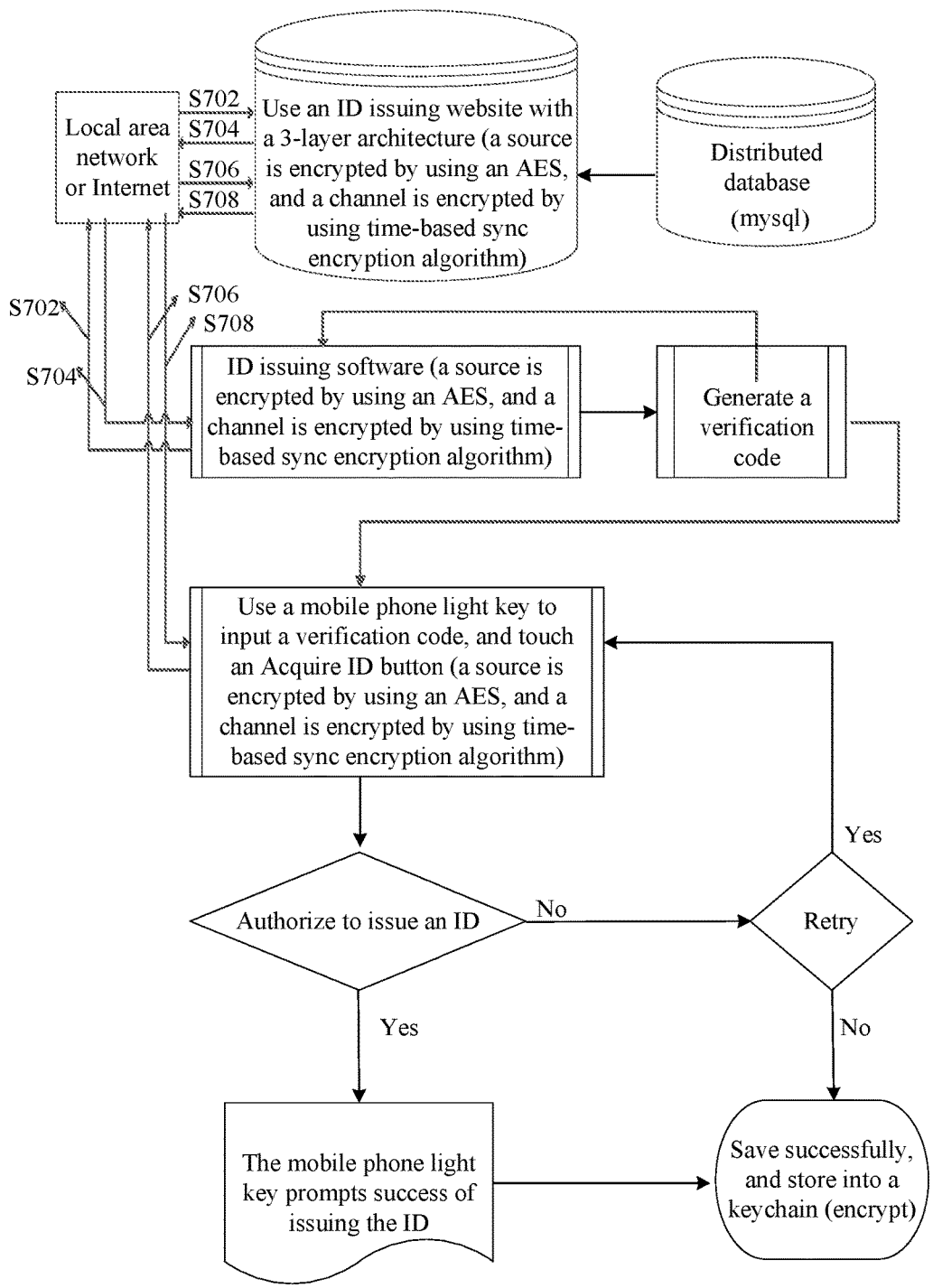
FIG. 7 is a flowchart of acquiring an ID that is encrypted in a time-based encryption manner according to a preferred Embodiment 4 of the present invention.

FIG. 7 is a flowchart of acquiring an ID that is encrypted in a time-based encryption manner according to a preferred Embodiment 4 of the present invention. As shown in FIG. 7, the process includes:

S702. An ID issuing end (software) sends an http request to an ID issuing platform (website), where a format of the request is: "http://"+"IP address or website domain name"+ "website path 1"+"requested quantity".

S704. After receiving the http request raised by the ID issuing end, the ID issuing platform parses information of the request, and navigates to a verification code generation program. The program generates an ID randomly and generates a verification code randomly first, and then binds a relationship between the ID and the verification code. The quantity of verification codes generated at a time is determined according to the requested quantity. After completion of the processing, information that carries the verification code is returned to the ID issuing software by means of the network. Before sending, the information part is encrypted, which includes source encryption and/or channel encryption. The source encryption is performed by using a symmetric encryption standard algorithm AES, and the channel encryption is performed by using a time-based sync encryption algorithm. Time generated dynamically each time is added into the source, and then scrambling is performed according to the time. An XOR operation is performed on the source information by using the obtained scrambling code. Therefore, the information generated each time is different, and a third party is prevented from spoofing by copying on the network. After receiving the returned information, the ID issuing end descrambles the encrypted information first, extracts the time information, and then compares the time indicated in the time information with the time stored in the database. If the former is greater than the latter, legality is determined; if the former is less than or equal to the latter, illegality is determined.

S706. The mobile phone photonic client sends an http request to the ID issuing platform, where a format of the request is: "http://"+"IP address or website domain name"+ "website path 2"+"verification code (encrypted)".

S708. After receiving the http request raised by the mobile phone photonic client, the ID issuing platform parses information of the request, navigates to a verification code determining and processing program according to the website path 2, and compares the verification code in the information with the verification code of the ID bound in S704. If they are the same, information that carries the ID is returned to the mobile phone photonic client by means of the network. Before sending, the information part is encrypted, which includes source encryption and/or channel encryption. The source encryption is performed by using a symmetric encryption standard algorithm AES, and the channel encryption is performed by using a time-based sync encryption algorithm. Time generated dynamically each time is added into the source, and then scrambling is performed according to the time. An XOR operation is performed on the source information by using the obtained scrambling code. Therefore, the information generated each time is different, and a third party is prevented from spoofing by copying on the network. After receiving the returned information, the mobile phone photonic client descrambles the encrypted information first, extracts the time information, and then compares the time indicated in the time information with the time stored in the database. If the former is greater than the latter, legality is determined; if the former is less than or equal to the latter, illegality is determined.

In this preferred embodiment, a high-security encryption and decryption algorithm AES is used to encrypt the source, a time-based sync symmetric algorithm is used to encrypt the channel, and a scrambling code library contains 64 scrambling codes, thereby preventing information spoofing and ensuring security of information in the network transmission.

Figure 8:
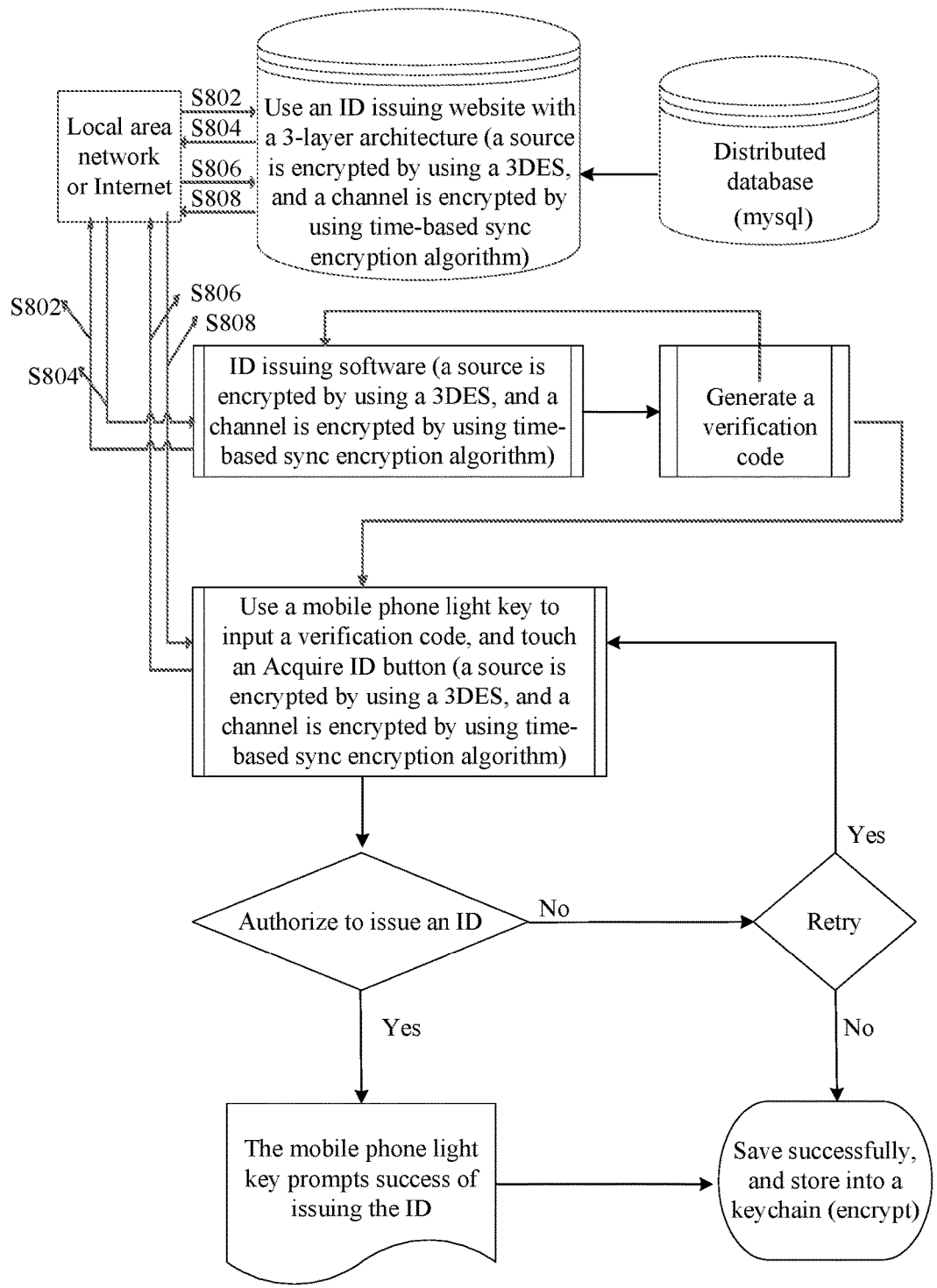
FIG. 8 is a flowchart of acquiring an ID that is encrypted in a time-based encryption manner according to a preferred Embodiment 5 of the present invention.

FIG. 8 is a flowchart of acquiring an ID that is encrypted in a time-based encryption manner according to a preferred Embodiment 5 of the present invention. As shown in FIG. 8, the process includes:

S802. An ID issuing end (software) sends an http request to an ID issuing platform (website), where a format of the request is: "http://"+"IP address or website domain name"+ "website path 1"+"requested quantity".

S804. After receiving the http request raised by the ID issuing end, the ID issuing platform parses information of the request, and navigates to a verification code generation program. The program generates an ID randomly and generates a verification code randomly first, and then binds a relationship between the ID and the verification code. The quantity of verification codes generated at a time is determined according to the requested quantity. After completion of the processing, information that carries the verification code is returned to the ID issuing software by means of the network. Before sending, the information part is encrypted, which includes source encryption and/or channel encryption. The source encryption is performed by using a symmetric encryption standard algorithm 3DES, and the channel encryption is performed by using a time-based sync encryption algorithm. Time generated dynamically each time is added into the source, and then scrambling is performed according to the time. An XOR operation is performed on the source information by using the obtained scrambling code. Therefore, the information generated each time is different, and a third party is prevented from spoofing by copying on the network. After receiving the returned information, the ID issuing end descrambles the encrypted information first, extracts the time information, and then compares the time indicated in the time information with the time stored in the database. If the former is greater than the latter, legality is determined; if the former is less than or equal to the latter, illegality is determined.

S806. The mobile phone photonic client sends an http request to the ID issuing platform, where a format of the request is: "http://"+"IP address or website domain name"+"website path 2"+"verification code (encrypted)".

S808. After receiving the http request raised by the mobile phone photonic client, the ID issuing platform parses information of the request, navigates to a verification code determining and processing program according to the website path 2, and compares the verification code in the information with the verification code of the ID bound in S804. If they are the same, information that carries the ID is returned to the mobile phone photonic client by means of the network. Before sending, the information part is encrypted, which includes source encryption and/or channel encryption. The source encryption is performed by using a symmetric encryption standard algorithm 3DES, and the channel encryption is performed by using a time-based sync encryption algorithm. Time generated dynamically each time is added into the source, and then scrambling is performed according to the time. An XOR operation is performed on the source information by using the obtained scrambling code. Therefore, the information generated each time is different, and a third party is prevented from spoofing by copying on the network. After receiving the returned information, the mobile phone photonic client descrambles the encrypted information first, extracts the time information, and then compares the time indicated in the time information with the time stored in the database. If the former is greater than the latter, legality is determined; if the former is less than or equal to the latter, illegality is determined.

In this preferred embodiment, a high-security encryption and decryption algorithm 3DES is used to encrypt the source, a time-based sync symmetric algorithm is used to encrypt the channel, and a scrambling code library contains 128 scrambling codes, thereby preventing information spoofing and ensuring security of information in the network transmission.

Figure 9:
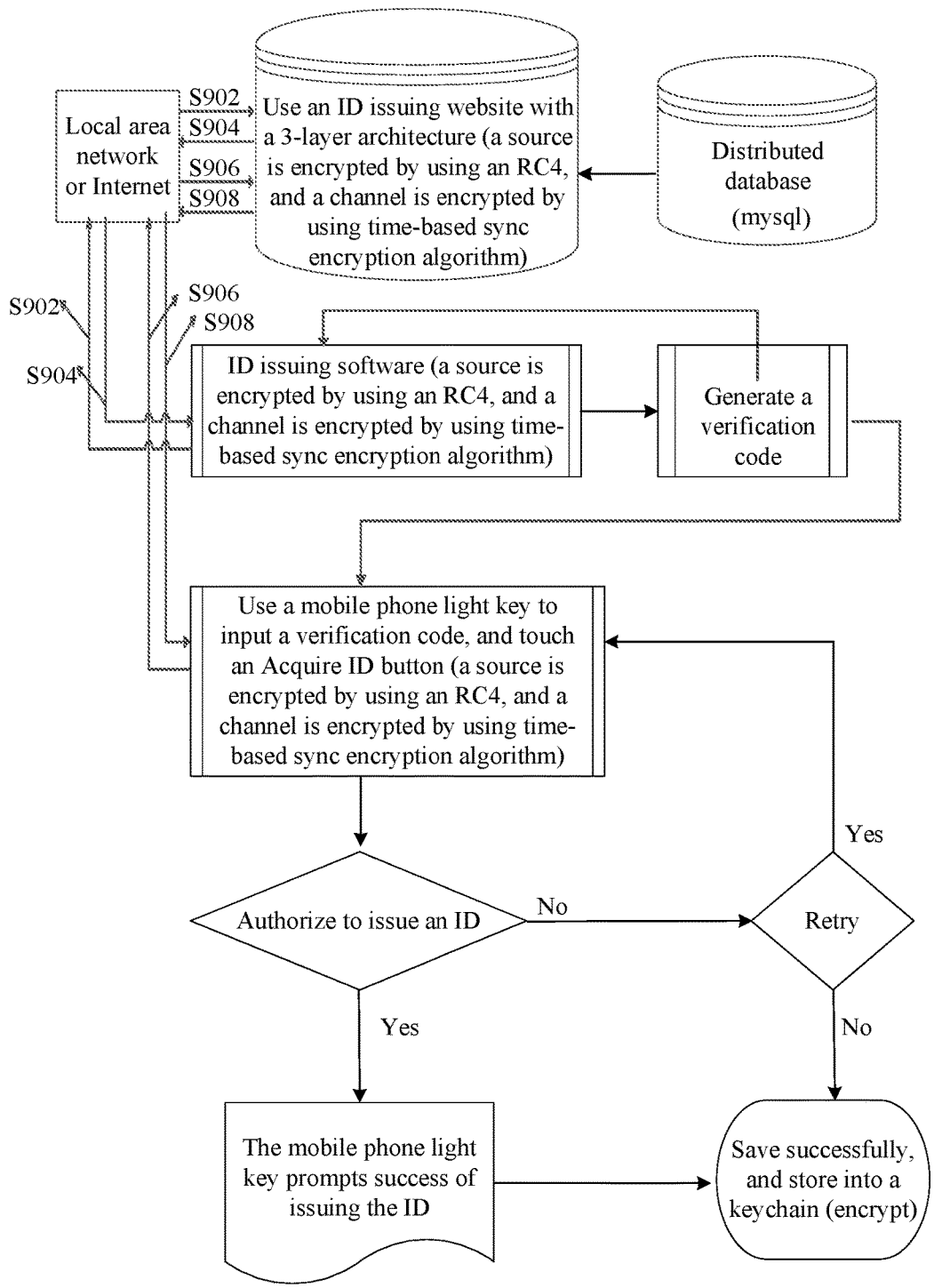
FIG. 9 is a flowchart of acquiring an ID that is encrypted in a time-based encryption manner according to a preferred Embodiment 6 of the present invention.

FIG. 9 is a flowchart of acquiring an ID that is encrypted in a time-based encryption manner according to a preferred Embodiment 6 of the present invention. As shown in FIG. 9, the process includes:

S902. An ID issuing end (software) sends an http request to an ID issuing platform (website), where a format of the request is: "http://"+"IP address or website domain name"+"website path 1"+"requested quantity".

S904. After receiving the http request raised by the ID issuing end, the ID issuing platform parses information of the request, and navigates to a verification code generation program. The program generates an ID randomly and generates a verification code randomly first, and then binds a relationship between the ID and the verification code. The quantity of verification codes generated at a time is determined according to the requested quantity. After completion of the processing, information that carries the verification code is returned to the ID issuing software by means of the network. Before sending, the information part is encrypted, which includes source encryption and/or channel encryption. The source encryption is performed by using a symmetric encryption standard algorithm RC4, and the channel encryption is performed by using a time-based sync encryption algorithm. Time generated dynamically each time is added into the source, and then scrambling is performed according to the time. An XOR operation is performed on the source information by using the obtained scrambling code. Therefore, the information generated each time is different, and a third party is prevented from spoofing by copying on the network. After receiving the returned information, the ID issuing end descrambles the encrypted information first, extracts the time information, and then compares the time indicated in the time information with the time stored in the database. If the former is greater than the latter, legality is determined; if the former is less than or equal to the latter, illegality is determined.

S906. The mobile phone photonic client sends an http request to the ID issuing platform, where a format of the request is: "http://"+"IP address or website domain name"+"website path 2"+"verification code (encrypted)".

S908. After receiving the http request raised by the mobile phone photonic client, the ID issuing platform parses information of the request, navigates to a verification code determining and processing program according to the website path 2, and compares the verification code in the information with the verification code of the ID bound in S904. If they are the same, information that carries the ID is returned to the ID issuing software by means of the network. Before sending, the information part is encrypted, which includes source encryption and/or channel encryption. The source encryption is performed by using a symmetric encryption standard algorithm RC4, and the channel encryption is performed by using a time-based sync encryption algorithm. Time generated dynamically each time is added into the source, and then scrambling is performed according to the time. An XOR operation is performed on the source information by using the obtained scrambling code. Therefore, the information generated each time is different, and a third party is prevented from spoofing by copying on the network. After receiving the returned information, the mobile phone light key descrambles the encrypted information first, extracts the time information, and then compares the time indicated in the time information with the time stored in the database. If the former is greater than the latter, legality is determined; if the former is less than or equal to the latter, illegality is determined.

In this preferred embodiment, a high-security encryption and decryption algorithm RC4 is used to encrypt the source, a time-based sync symmetric algorithm is used to encrypt the channel, and a scrambling code library contains 256 scrambling codes, thereby preventing information spoofing and ensuring security of information in the network transmission.

Preferably, the identity authentication system provided in the embodiments and preferred embodiments of the present invention may also be disposed in other access control system in addition to the photonic access control system, and may also be applied to a ticketing system or a consumption management system.

Figure 10:
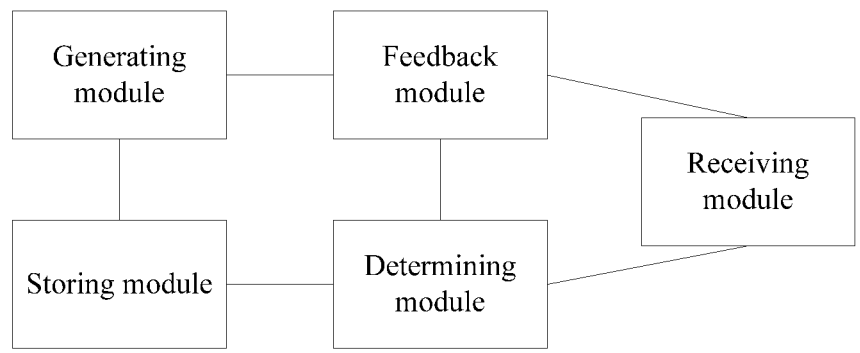
FIG. 10 is a structural block diagram of an identity authentication apparatus according to an embodiment of the present invention.

Based on the identity authentication system, this embodiment further provides an identity authentication apparatus, which communicates with the identity authentication request apparatus. As shown in FIG. 10, the identity authentication apparatus includes: a generating module, configured to receive a verification code issuing request sent by the identity authentication request apparatus, generate an ID and a corresponding verification code according to the verification code issuing request, and bind the generated ID and the verification code; a storing module, configured to store the generated ID, the verification code, and a binding record; a feedback module, configured to feed back feedback information that carries the verification code to the identity authentication request apparatus; a receiving module, configured to receive an ID issuing request from the identity authentication request apparatus, where the ID issuing request includes the verification code carried in the feedback information; and a determining module, configured to parse the verification code included in the received ID issuing request and determine whether the verification code included in the received ID issuing request matches the verification code stored in the storing module, where the feedback module is further configured to: when a determining result of the determining module is matching, send allocation information that carries the ID to the identity authentication request apparatus.

Preferably, the identity authentication apparatus may further include an encrypting module, configured to perform source encryption and/or channel encryption for the feedback information that carries the verification code before the feedback module feeds back the feedback information that carries the verification code to the identity authentication requestication code.

Preferably, the encrypting module may be further configured to perform source encryption and/or channel encryption for the allocation information that carries the ID before the feedback module sends the allocation information that carries the ID to the identity authentication request apparatus.

Preferably, the encrypting module may be further configured to encrypt the generated ID, and the verification code and the binding record by using a sync encryption algorithm that is based on a scrambling code and a pseudo-code.

Preferably, the scrambling code may be a scrambling code that is randomly selected from a randomly generated hexadecimal scrambling code group, where a quantity of bits of the scrambling code is consistent with a quantity of bits of information that needs to be encrypted; the encrypting, by the encrypting module, the generated ID, the corresponding verification code and the binding record by using a sync encryption algorithm based on a scrambling code includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

Preferably, the pseudo-code may be a group of randomly generated digits, letters, symbols, or a combination of at least one thereof; and the encrypting, by the encrypting module, the generated ID, the corresponding verification code and the binding record by using a sync encryption algorithm based on a scrambling code includes: adding the pseudo-code into a trailer of the information that is encrypted by using the scrambling code, so that the quantity of bits of the information increases to a preset quantity of bits.

Preferably, algorithms used for the channel encryption include a time-based sync encryption algorithm, and the source encryption is performed by using one of the following encryption algorithms: an advanced encryption standard AES algorithm, a triple data encryption standard 3DES algorithm, and an RC4 algorithm.

Preferably, the performing, by the encrypting module, channel encryption by using a time-based sync encryption algorithm includes: acquiring current time information; adding the time information into the feedback information or the allocation information; generating or selecting a group of scrambling codes according to the time information; and performing scrambling for the feedback information or the allocation information by using the generated or selected group of scrambling codes.

Figure 11:
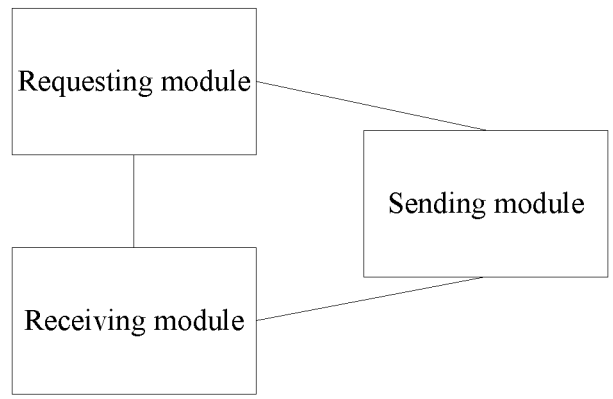
FIG. 11 is a structural block diagram of an identity authentication request apparatus according to an embodiment of the present invention.

Based on the identity authentication system, this embodiment further provides an identity authentication request apparatus, which communicates with the identity authentication apparatus. As shown in FIG. 11, the identity authentication request apparatus includes: a requesting module, configured to send a verification code issuing request to the identity authentication apparatus; a receiving module, configured to receive feedback information that carries a verification code from the identity authentication apparatus, where the verification code is generated by the identity authentication apparatus according to the verification code issuing request in response to the verification code issuing request, where the identity authentication apparatus further generates an ID corresponding to the verification code, binds the generated ID and the verification code, and stores the generated ID, the verification code and a binding record; a sending module, configured to send an ID issuing request to the identity authentication request apparatus, where the ID issuing request includes the verification code carried in the feedback information; and the receiving module is further configured to receive allocation information that carries the ID from the identity authentication apparatus, where the allocation information is sent by the authentication apparatus to the identity authentication request apparatus when the identity authentication apparatus parses the received ID issuing request and determines that the verification code included in the ID issuing request matches the stored verification code.

Preferably, the identity authentication request apparatus may further include an encrypting module, configured to encrypt and store the ID, a unique identifier of the identity authentication request apparatus, and a counter value after receiving the allocation information that carries the ID.

Preferably, the encrypting module may be further configured to encrypt the ID, the unique identifier of the identity authentication request apparatus, and the counter value by using the sync encryption algorithm that is based on a scrambling code and a pseudo-code.

Preferably, the scrambling code is a scrambling code that is randomly selected from a randomly generated hexadecimal scrambling code group, where a quantity of bits of the scrambling code is consistent with a quantity of bits of information that needs to be encrypted; the encrypting, by the encrypting module, the ID, a unique identifier of the identity authentication request apparatus, and a counter value by using a sync encryption algorithm based on a scrambling code includes: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

Preferably, the identity authentication request apparatus may further include a determining module, configured to decrypt encrypted information received from the identity authentication apparatus, so as to extract the time information; if a time in the time information is greater than a time stored in the identity authentication request apparatus, determine that the verification code fed back or the allocated ID is legal; otherwise, if the time in the time information is less than or equal to the time stored in the identity authentication request apparatus, determine that the verification code fed back or the allocated ID is illegal.

Figure 12:
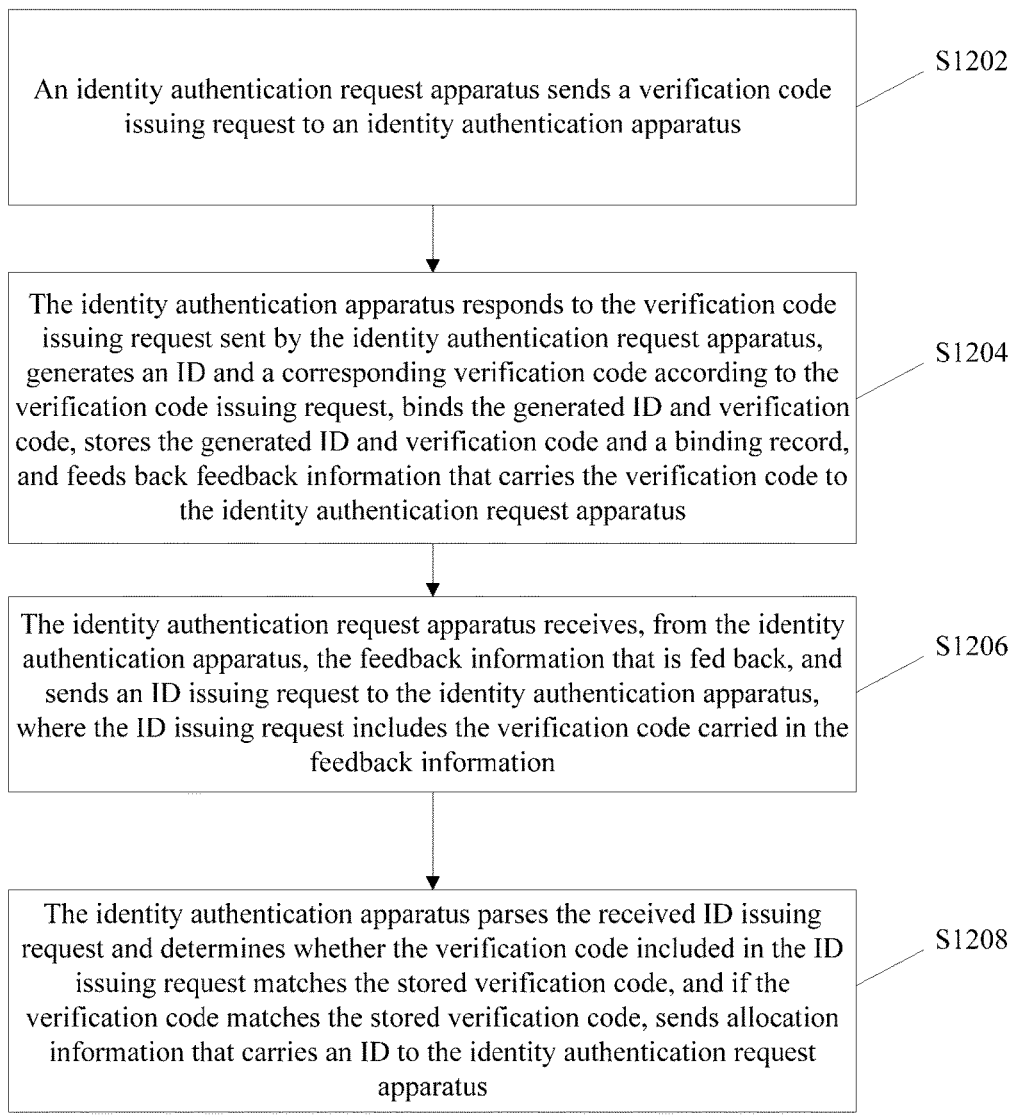
FIG. 12 is a flowchart of an identity authentication method according to an embodiment of the present invention.

Based on the identity authentication system, this embodiment further provides an identity authentication method, which, as shown in FIG. 12, is applied to an identity authentication request apparatus and an identity authentication apparatus and includes:

Step S1202: An identity authentication request apparatus sends a verification code issuing request to an identity authentication apparatus.

Step S1204: The identity authentication apparatus responds to the verification code issuing request sent by the identity authentication request apparatus, generates an ID and a corresponding verification code according to the verification code issuing request, binds the generated ID and the verification code, stores the generated ID and the verification code and a binding record, and feeds back feedback information that carries the verification code to the identity authentication request apparatus.

Step S1206: The identity authentication request apparatus receives, from the identity authentication apparatus, the feedback information that is fed back, and sends an ID issuing request to the identity authentication apparatus, where the ID issuing request includes the verification code carried in the feedback information.

Step S1208: The identity authentication apparatus parses the received ID issuing request and determines whether the verification code included in the ID issuing request matches the stored verification code, and if the verification code included in the received ID issuing request matches the stored verification code, sends allocation information that carries the ID to the identity authentication request apparatus.

Preferably, the identity authentication method may further include: encrypting and storing, by the identity authentication request apparatus, the ID, a unique identifier of the identity authentication request apparatus, and a counter value after receiving the allocation information that carries the ID.

Preferably, before the step of feeding back the feedback information that carries the verification code to the identity authentication request apparatus, the identity authentication method may further include: performing source encryption and/or channel encryption for the feedback information that carries the verification code.

Preferably, before the step of sending the allocation information that carries the ID to the identity authentication request apparatus, the identity authentication method may further include: performing source encryption and/or channel encryption for the allocation information that carries the ID.

Preferably, the identity authentication apparatus may encrypt the generated ID, and the verification code and the binding record by using a sync encryption algorithm that is based on a scrambling code and a pseudo-code; and the identity authentication request apparatus may encrypt the ID, the unique identifier of the identity authentication request apparatus, and the counter value by using the sync encryption algorithm that is based on a scrambling code and a pseudo-code.

Preferably, the scrambling code may be a scrambling code that is randomly selected from a randomly generated hexadecimal scrambling code group, and a quantity of bits of the scrambling code is consistent with a quantity of bits of information that needs to be encrypted. The encrypting the generated ID, and the verification code and the binding record by using a sync encryption algorithm that is based on a scrambling code, or the encrypting the ID, the unique identifier of the identity authentication request apparatus, and the counter value by using the sync encryption algorithm that is based on a scrambling code, may include: converting the information, which needs to be encrypted, into hexadecimal information; and using the scrambling code to perform an operation bit by bit on the information that is converted into the hexadecimal information and needs to be encrypted, where the operation includes one of the following: an XOR operation, a negation operation, seeking a two's complement, and seeking a one's complement.

Preferably, the pseudo-code may be a group of randomly generated digits, letters, symbols, or a combination of at least one thereof; and the encrypting the generated ID, and the verification code and the binding record by using a sync encryption algorithm that is based on a pseudo-code, or the encrypting the ID, the unique identifier of the identity authentication request apparatus, and the counter value by using the sync encryption algorithm that is based on a pseudo-code, may include: adding the pseudo-code into a trailer of the information that is encrypted by using the scrambling code, so that the quantity of bits of the information increases to a preset quantity of bits.

Preferably, algorithms used for the channel encryption may include a time-based sync encryption algorithm, and the source encryption may be performed by using one of the following encryption algorithms: an AES algorithm, a 3DES algorithm, and an RC4 algorithm.

Preferably, the performing channel encryption by using a time-based sync encryption algorithm includes: acquiring current time information; adding the time information into the feedback information or the allocation information; generating or selecting a group of scrambling codes according to the time information; and performing scrambling for the feedback information or the allocation information by using the generated or selected scrambling code.

Preferably, the identity authentication method may further include: decrypting, by the identity authentication request apparatus, encrypted information received from the identity authentication apparatus, so as to extract the time information; if a time in the time information is greater than a time stored in the identity authentication request apparatus, determining that the verification code fed back or the allocated ID is legal; otherwise, if the time in the time information is less than or equal to the time stored in the identity authentication request apparatus, determining that the verification code fed back or the allocated ID is illegal.

From the foregoing description, it can be seen that the technical solution provided in the embodiments of the present invention is universally applicable to multiple systems such as a photonic access control system to implement a function of ID distribution or identity authentication practically and effectively, and can improve information security of an identity authentication system from both the perspective of information storing and the perspective of information transmission. In the technical solution provided in the embodiments of the present invention, different encryption manners that generate special effects are applied to different information and different information transmission processes, and the working process of the identity authentication system is optimized correspondingly, which maximally ensures information security of the identity authentication system.

The foregoing descriptions are merely exemplary embodiments of the present invention, but are not intended to limit the present invention. Persons skilled in the art understand that the present invention may have various modifications and variations. Any modification, equivalent replacement, and improvement made without departing from the spirit and principle of the present invention shall fall within the protection scope of the present invention.

INDUSTRIAL APPLICABILITY

The present invention provides an identity authentication system, apparatus and method and an identity authentication request apparatus. The technical solution provided in the embodiments of the present invention is universally applicable to multiple systems such as a photonic access control system to implement ID distribution or identity authentication practically and effectively, and can improve information security of the identity authentication system from both the perspective of information storing and the perspective of information transmission. In the technical solution provided in the embodiments of the present invention, different encryption manners that generate special effects are applied to different information and different information transmission processes, and the working process of the identity authentication system is optimized correspondingly, which maximally ensures information security of the identity authentication system.

What is claimed is:

1. An identity authentication system, comprising an identity authentication request apparatus and an identity authentication apparatus, wherein the identity authentication request apparatus comprises a first hardware processor coupled with a first memory and configured to execute program modules stored on the first memory, the identity authentication apparatus comprises a second hardware processor coupled with a second memory and configured to execute program modules stored on the second memory;

the first hardware processor is configured to send a verification code issuing request to the identity authentication apparatus;

the second hardware processor is configured to respond to the verification code issuing request sent by the identity authentication request apparatus, generate an identity (ID) and a corresponding verification code according to the verification code issuing request, bind the generated ID and the verification code, store the generated ID, the verification code, and a binding record, and feed back feedback information that carries the verification code to the identity authentication request apparatus;

the first hardware processor is further configured to receive the feedback information from the identity authentication apparatus, and send an ID issuing request to the identity authentication apparatus, wherein the ID issuing request comprises the verification code carried in the feedback information; and the second hardware processor is further configured to parse the received ID issuing request and determine whether the verification code comprised in the ID issuing request matches the stored verification code, and if the verification code comprised in the ID issuing request matches the stored verification code, send allocation information that carries the ID to the identity authentication request apparatus;

wherein the first hardware processor apparatus is further configured to encrypt and store the ID, a unique identifier of the identity authentication request apparatus, and a counter value after receiving the allocation information that carries the ID;

wherein the second hardware processor is further configured to encrypt the generated ID, the verification code and the binding record by using a sync encryption algorithm that is based on a scrambling code and a pseudo-code; and the first hardware processor is further configured to encrypt the ID, the unique identifier of the identity authentication request apparatus, and the counter value by using the sync encryption algorithm that is based on a scrambling code and a pseudo-code;

wherein the scrambling code is a scrambling code that is randomly selected from a randomly generated hexadecimal scrambling code group, and a quantity of bits of the scrambling code is consistent with a quantity of bits of information that needs to be encrypted; wherein the second hardware processor is further configured to encrypt the generated ID, the verification code and the binding record by using a sync encryption algorithm that is based on a scrambling code, or the first hardware processor is further configured to encrypt the ID, the unique identifier of the identity authentication request apparatus, and the counter value by using the sync encryption algorithm that is based on a scrambling code by following steps: converting the information, which needs to be encrypted, into hexadecimal information; and using the scrambling code to perform an operation bit by bit on the information that is converted into the hexadecimal information and needs to be encrypted, wherein the operation comprises one of the following: an XOR operation, a negation operation, seeking a two's complement, and seeking a one's complement;

wherein the pseudo-code is a group of randomly generated digits, letters, symbols, or a combination of at least one thereof; wherein the second hardware processor is further configured to encrypt the generated ID, and the verification code and the binding record by using a sync encryption algorithm that is based on a pseudo-code, or the first hardware processor is further configured to encrypt the ID, the unique identifier of the identity authentication request apparatus, and the counter value by using the sync encryption algorithm that is based on a pseudo-code by the following step: adding the pseudo-code into a trailer of the information that is encrypted by using the scrambling code, so that the quantity of bits of the information increases to a preset quantity of bits.

2. The identity authentication system according to claim 1, wherein the second hardware processor is further configured to perform source encryption and/or channel encryption for the feedback information that carries the verification code before the feedback information that carries the verification code is fed back to the identity authentication request apparatus; and the second hardware processor is further configured to perform source encryption and/or channel encryption for the allocation information that carries the ID before the allocation information that carries the ID is sent to the identity authentication request apparatus.

3. The identity authentication system according to claim 2, wherein algorithms used for the channel encryption comprise a time-based sync encryption algorithm, the second hardware processor is further configured to perform channel encryption by using the time-based sync encryption algorithm by following steps:

acquiring current time information;

adding the time information into the feedback information or the allocation information;

generating or selecting a group of scrambling codes according to the time information; and performing scrambling for the feedback information or the allocation information by using the generated or selected group of scrambling codes.

4. The identity authentication system according to claim 3, wherein the first hardware processor is further configured to decrypt encrypted information received from the identity authentication apparatus, so as to extract the time information; if a time in the time information is greater than a time stored in the identity authentication request apparatus, determine that the verification code fed back or the allocated ID is legal; otherwise, if the time in the time information is less than or equal to the time stored in the identity authentication request apparatus, determine that the verification code fed back or the allocated ID is illegal.

5. An identity authentication apparatus, wherein the identity authentication apparatus communicates with an identity authentication request apparatus and comprises a hardware processor coupled with a memory and configured to execute program modules stored on the memory, wherein the program modules comprise:

a generating module, configured to receive a verification code issuing request sent by the identity authentication request apparatus, generate an identity (ID) and a corresponding verification code according to the verification code issuing request, and bind the generated ID and the verification code;

a storing module, configured to store the generated ID, the verification code, and a binding record;

a feedback module, configured to feed back feedback information that carries the verification code to the identity authentication request apparatus;

a receiving module, configured to receive an ID issuing request from the identity authentication request apparatus, wherein the ID issuing request comprises the verification code carried in the feedback information; and a determining module, configured to parse the verification code comprised in the received ID issuing request and determine whether the verification code comprised in the received ID issuing request matches the verification code stored in the storing module, wherein the feedback module is further configured to: when a determining result of the determining module is matching, send allocation information that carries the ID to the identity authentication request apparatus;

wherein the identity authentication request apparatus is further configured to encrypt and store the ID, a unique identifier of the identity authentication request apparatus, and a counter value after receiving the allocation information that carries the ID;

wherein the identity authentication apparatus is further configured to encrypt the generated ID, the verification code and the binding record by using a sync encryption algorithm that is based on a scrambling code and a pseudo-code; and the identity authentication request apparatus is further configured to encrypt the ID, the unique identifier of the identity authentication request apparatus, and the counter value by using the sync encryption algorithm that is based on a scrambling code and a pseudo-code;

wherein the scrambling code is a scrambling code that is randomly selected from a randomly generated hexadecimal scrambling code group, and a quantity of bits of the scrambling code is consistent with a quantity of bits of information that needs to be encrypted; wherein the identity authentication apparatus is further configured to encrypt the generated ID, the verification code and the binding record by using a sync encryption algorithm that is based on a scrambling code, or the identity authentication request apparatus is further configured to encrypt the ID, the unique identifier of the identity authentication request apparatus, and the counter value by using the sync encryption algorithm that is based on a scrambling code by following steps: converting the information, which needs to be encrypted, into hexadecimal information; and using the scrambling code to perform an operation bit by bit on the information that is converted into the hexadecimal information and needs to be encrypted, wherein the operation comprises one of the following: an XOR operation, a negation operation, seeking a two's complement, and seeking a one's complement;

wherein the pseudo-code is a group of randomly generated digits, letters, symbols, or a combination of at least one thereof; wherein the identity authentication apparatus is further configured to encrypt the generated ID, and the verification code and the binding record by using a sync encryption algorithm that is based on a pseudo-code, or the identity authentication request is further configured to encrypt the ID, the unique identifier of the identity authentication request apparatus, and the counter value by using the sync encryption algorithm that is based on a pseudo-code by the following step: adding the pseudo-code into a trailer of the information that is encrypted by using the scrambling code, so that the quantity of bits of the information increases to a preset quantity of bits.

6. An identity authentication method, applied to an identity authentication apparatus and an identity authentication request apparatus, wherein the identity authentication request apparatus comprises a first hardware processor coupled with a first memory and configured to execute program modules stored on the first memory, the identity authentication apparatus comprises a second hardware processor coupled with a second memory and configured to execute program modules stored on the second memory; wherein the identity authentication method comprises:

the first hardware processor sends a verification code issuing request to the identity authentication apparatus;

the second hardware processor responds to the verification code issuing request sent by the identity authentication request apparatus, generates an identity (ID) and a corresponding verification code according to the verification code issuing request, binds the generated ID and the verification code, stores the generated ID and the verification code and a binding record, and feeds back feedback information that carries the verification code to the identity authentication request apparatus;

the first hardware processor receives, from the identity authentication apparatus, the feedback information that is fed back, and sends an ID issuing request to the identity authentication apparatus, wherein the ID issuing request comprises the verification code carried in the feedback information; and the second hardware processor parses the received ID issuing request and determines whether the verification code comprised in the ID issuing request matches the stored verification code, and if the verification code comprised in the received ID issuing request matches the stored verification code, sends allocation information that carries the ID to the identity authentication request apparatus;

wherein the identity authentication method further comprises: encrypting and storing, by the first hardware processor, the ID, a unique identifier of the identity authentication request apparatus, and a counter value after receiving the allocation information that carries the ID;

wherein the second hardware processor encrypts the generated ID, and the verification code and the binding record by using a sync encryption algorithm that is based on a scrambling code and a pseudo-code; and the first hardware processor encrypts the ID, the unique identifier of the identity authentication request apparatus, and the counter value by using the sync encryption algorithm that is based on a scrambling code and a pseudo-code;

wherein the scrambling code is a scrambling code that is randomly selected from a randomly generated hexadecimal scrambling code group, and a quantity of bits of the scrambling code is consistent with a quantity of bits of information that needs to be encrypted; and encrypting, by the second hardware processor, the generated ID, the verification code, and the binding record by using a sync encryption algorithm that is based on a scrambling code, or encrypting, by the first hardware processor, the ID, the unique identifier of the identity authentication request apparatus, and the counter value by using the sync encryption algorithm that is based on a scrambling code, comprises: converting, by the first hardware processor or the second hardware processor, the information, which needs to be encrypted, into hexadecimal information; and using, by the first hardware processor or the second hardware processor, the scrambling code to perform an operation bit by bit on the information that is converted into the hexadecimal information and needs to be encrypted, wherein the operation comprises one of the following: an XOR operation, a negation operation, seeking a two's complement, and seeking a one's complement;

wherein the pseudo-code is a group of randomly generated digits, letters, symbols, or a combination of at least one thereof; encrypting, by the second hardware processor, the generated ID, and the verification code and the binding record by using a sync encryption algorithm that is based on a pseudo-code, or encrypting, by the first hardware processor, the ID, the unique identifier of the identity authentication request apparatus, and the counter value by using the sync encryption algorithm that is based on a pseudo-code, comprises: adding, by the first hardware processor or the second hardware processor, the pseudo-code into a trailer of the information that is encrypted by using the scrambling code, so that the quantity of bits of the information increases to a preset quantity of bits.

7. The identity authentication method according to claim 6, wherein before the step of feeding back the feedback information that carries the verification code to the identity authentication request apparatus, the identity authentication method further comprises:

performing, by the second hardware processor, source encryption and/or channel encryption for the feedback information that carries the verification code.

8. The identity authentication method according to claim 6, wherein before the step of sending the allocation information that carries the ID to the identity authentication request apparatus, the identity authentication method further comprises:

performing, by the second hardware processor, source encryption and/or channel encryption for the allocation information that carries the ID.

9. The identity authentication method according to claim 8, wherein algorithms used for the channel encryption comprise a time-based sync encryption algorithm, and the source encryption is performed by using one of the following encryption algorithms: an advanced encryption standard AES algorithm, a triple data encryption standard 3DES algorithm, and an RC4 algorithm.

10. The identity authentication method according to claim 9, wherein performing, by the second hardware processor, channel encryption by using the time-based sync encryption algorithm comprises:

acquiring current time information;

adding the time information into the feedback information or the allocation information;

generating or selecting a group of scrambling codes according to the time information; and performing scrambling for the feedback information or the allocation information by using the generated or selected scrambling codes.

11. The identity authentication method according to claim 10, wherein the identity authentication method further comprises:

decrypting, by the first hardware processor, encrypted information received from the identity authentication apparatus, so as to extract the time information; if a time in the time information is greater than a time stored in the identity authentication request apparatus, determining that the verification code fed back or the allocated ID is legal; otherwise, if the time in the time information is less than or equal to the time stored in the identity authentication request apparatus, determining that the verification code fed back or the allocated ID is illegal.

* * * * *